US010502580B2

(12) United States Patent
Choi et al.

(10) Patent No.: US 10,502,580 B2
(45) Date of Patent: Dec. 10, 2019

(54) METHOD AND APPARATUS FOR PROVIDING AUGMENTED REALITY FUNCTION IN ELECTRONIC DEVICE

(71) Applicant: Samsung Electronics Co., Ltd., Suwon-si, Gyeonggi-do (KR)

(72) Inventors: Nari Choi, Seoul (KR); Jin-Ho Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/936,769

(22) Filed: Mar. 27, 2018

(65) Prior Publication Data

US 2018/0274936 A1    Sep. 27, 2018

(30) Foreign Application Priority Data

Mar. 27, 2017 (KR) .................. 10-2017-0038505

(51) Int. Cl.
*G09G 5/00* (2006.01)
*G01C 21/36* (2006.01)
*G06T 19/00* (2011.01)
*H04N 7/18* (2006.01)

(52) U.S. Cl.
CPC ..... *G01C 21/3602* (2013.01); *G01C 21/3647* (2013.01); *G01C 21/3682* (2013.01); *G06T 19/006* (2013.01); *H04N 7/185* (2013.01); *G01C 21/3667* (2013.01)

(58) Field of Classification Search
CPC .................................................. G06T 19/006

USPC ........................................................ 345/633
See application file for complete search history.

(56) References Cited

U.S. PATENT DOCUMENTS

| | | | |
|---|---|---|---|
| 8,750,559 B2* | 6/2014 | Sung | G06T 19/006 345/633 |
| 9,495,783 B1 | 11/2016 | Samarasekera et al. | |
| 2009/0289956 A1* | 11/2009 | Douris | H04W 4/21 345/633 |
| 2011/0199479 A1* | 8/2011 | Waldman | G01C 21/3602 348/116 |
| 2012/0038671 A1* | 2/2012 | Min | G06T 19/00 345/633 |
| 2012/0075341 A1 | 3/2012 | Sandberg | |

(Continued)

FOREIGN PATENT DOCUMENTS

KR    10-2012-0015637 A    2/2012

*Primary Examiner* — Javid A Amini
(74) *Attorney, Agent, or Firm* — Jefferson IP Law, LLP

(57) ABSTRACT

A method and an apparatus for providing an augmented reality (AR) function of showing virtual information objects overlaid on a real image or background (for example, a real world) as one image in an electronic device are provided. The electronic device includes a camera, a display for displaying an AR screen, and at least one processor functionally connected to the camera module and the display. The at least one processor is configured to implement an AR function, determine a plurality of contents according to a set criterion in a view direction of a user, group the plurality of contents into at least one group, generate a group card corresponding to the plurality of contents and a single card corresponding to a single content based on a grouping result, and display the group card and the single card mapped to a real object on the AR screen.

20 Claims, 16 Drawing Sheets

(56) References Cited

U.S. PATENT DOCUMENTS

| | | | | |
|---|---|---|---|---|
| 2012/0092372 A1* | 4/2012 | Ryu | G06T 19/006 | 345/633 |
| 2012/0105474 A1* | 5/2012 | Cudalbu | G01C 21/20 | 345/633 |
| 2012/0223966 A1* | 9/2012 | Lim | G06F 3/011 | 345/633 |
| 2014/0055491 A1* | 2/2014 | Malamud | H04W 4/21 | 345/633 |
| 2014/0306996 A1* | 10/2014 | Cao | G06T 19/006 | 345/633 |
| 2014/0354688 A1* | 12/2014 | Min | G06T 19/006 | 345/633 |
| 2015/0379360 A1* | 12/2015 | Rhee | G01C 21/3644 | 345/633 |
| 2016/0049013 A1* | 2/2016 | Tosas Bautista | G06T 19/006 | 345/633 |

* cited by examiner

METHOD AND APPARATUS FOR PROVIDING AUGMENTED REALITY FUNCTION IN ELECTRONIC DEVICE

CROSS-REFERENCE TO RELATED APPLICATION(S)

This application is based on and claims priority under 35 U.S.C. § 119 to Korean Patent Application No. 10-2017-0038505, filed on Mar. 27, 2017, in the Korean Intellectual Property Office, the disclosure of which is incorporated by reference herein in its entirety.

TECHNICAL FIELD

The disclosure relates to a method and an apparatus for providing an augmented reality (AR) function of showing virtual information objects overlaid on a real image or background (for example, a real world) as one image in an electronic device.

BACKGROUND

Recently, various types of electronic devices, such as a mobile communication terminal, a smartphone, a tablet personal computer (PC), a notebook, a personal digital assistant (PDA), a wearable device, a digital camera, and a PC, have been widely used with the development of digital technologies.

Research and development, as well as usage, not only of a call function and a multimedia play function (e.g., music play and video play) but also of an augmented-reality (AR) function in electronic devices have been increasing in recent years. AR is a technique for displaying a real object (e.g., real environment) combined with relevant virtual information (e.g., text, an image, or the like). Unlike virtual reality (VR), which deals only with a virtual space and virtual objects, AR provides relevant virtual objects on an object in a real environment, thereby providing a user with additional information that is difficult to obtain from the real environment alone.

The above information is presented as background information only to assist with an understanding of the disclosure. No determination has been made, and no assertion is made, as to whether any of the above might be applicable as prior art with regard to the disclosure.

SUMMARY

However, the augmented-reality (AR) function provided by electronic device of the related art has limitations in effectively presenting real objects and information cards on a limited screen as the number of real objects provided in an AR and the number of information cards (or windows) providing information related to real objects increase. For example, a great number of information cards on a real object may make it difficult to recognize the real object. Further, as a great number of information cards overlap each other and are irregularly displayed on a screen having a limited size, a user may have difficulty obtaining relevant information. Thus, there is increasing user need to enable the intuitive use of an AR function.

Aspects of the disclosure are to address at least the above-mentioned problems and/or disadvantages and to provide at least the advantages described below. Accordingly, an aspect of the disclosure is to provide a method and an apparatus for providing an AR function of showing virtual information objects overlaid on a real image or background (for example, a real world) as one image in an electronic device.

Another aspect of the disclosure is to provide a method and an apparatus for intuitively and simply arranging and providing information cards for a user in an AR.

Another aspect of the disclosure is to provide a method and an apparatus for grouping content on the same line (e.g., z-axis) in a view direction (or view angle) of a user in an AR and configuring an AR screen using an information card of content located at the shortest distance among the grouped content.

Another aspect of the disclosure is to provide a method and an apparatus for navigating to grouped content (e.g., a plurality of pieces of content on the same line) or for providing detailed information according to a user interaction on the uppermost information card in an AR.

In accordance with an aspect of the disclosure, an electronic device is provided. The electronic device includes a camera, a display to display an AR screen, and at least one processor functionally connected to the camera and the display, wherein the at least one processor is configured to implement an AR function, determine a plurality of contents according to a set criterion in a view direction of a user, group the plurality of contents into at least one group, generate a group card corresponding to the plurality of contents and a single card corresponding to a single content based on a grouping result, and display the group card and the single card mapped to a real object on the AR screen.

In accordance with another aspect of the disclosure, an operation method of an electronic device is provided. The operation method includes implementing an AR function, determining a plurality of contents according to a set criterion in a view direction of a user, grouping the plurality of contents into at least one group, generating a group card corresponding to the plurality of contents and a single card corresponding to a single content based on a grouping result, and displaying the group card and the single card mapped to a real object on the AR screen.

In accordance with another aspect of the disclosure, a computer-readable recording medium that records a program for a processor to implement the method is provided.

An electronic device and an operation method thereof according to various embodiments may improve an AR function of the electronic device. According to various embodiments, a plurality of contents mapped to the same direction (or angle) in an AR is grouped according to direction, thereby providing information cards. According to various embodiments, information cards mapped to a real object are grouped according to a set criterion and are effectively arranged on a limited screen of an electronic device, thereby increasing the readability or visibility of a user. According to various embodiments, the usability, convenience, intuitiveness, or utilization of an electronic device may be improved by an electronic device according to various embodiments.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
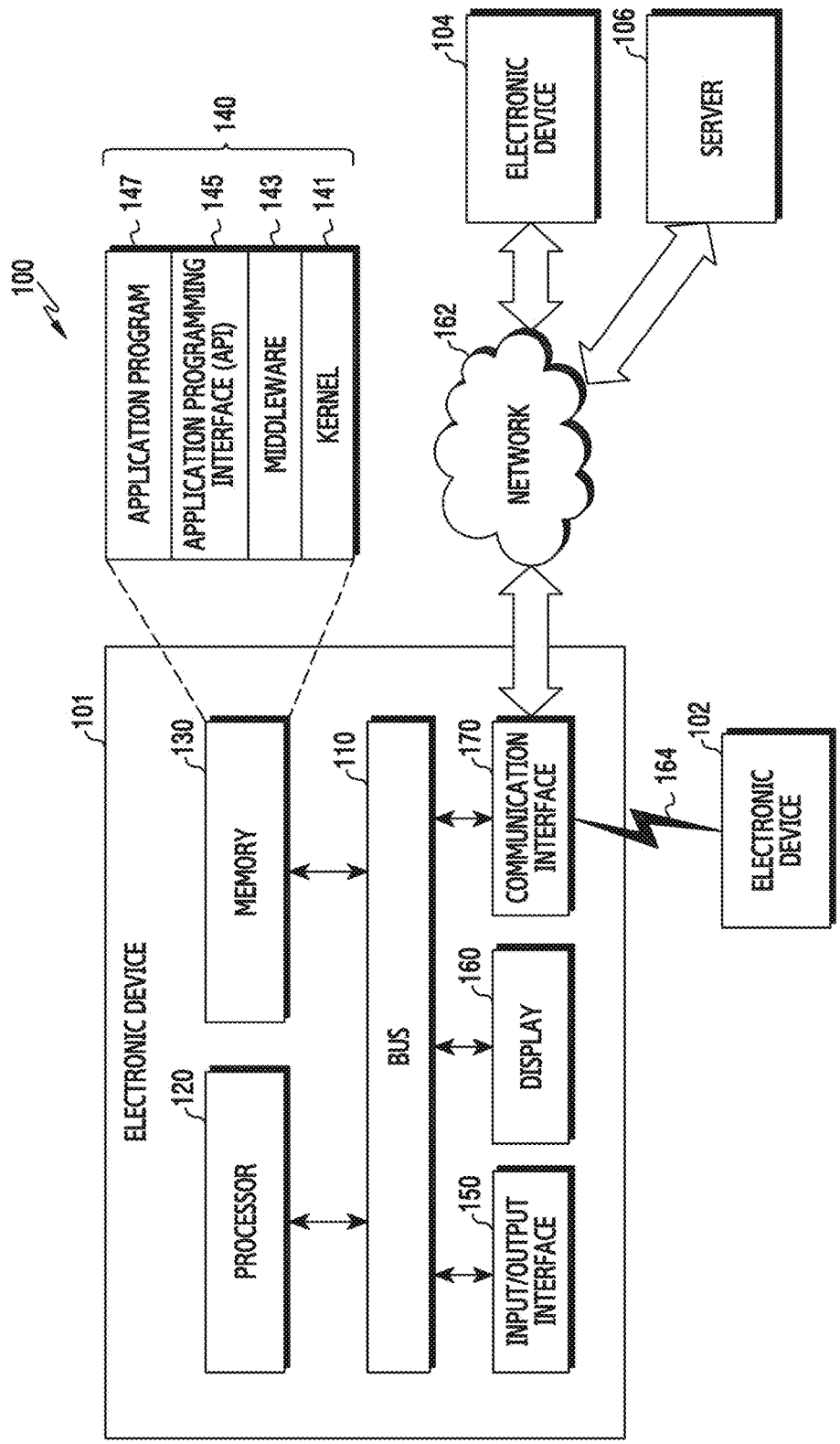
FIG. 1 illustrates a network environment including an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the present document are mentioned below with reference to the accompanying drawings. An embodiment and the terms used in this do not intend to limit the technology mentioned in the present document to a specific embodiment form, and should be construed as including various changes of the corresponding embodiment, equivalents thereof, and/or alternatives thereof. In the drawings, like reference symbols may denote like constituent elements. The expression of a singular form may include the expression of a plural form unless otherwise dictating clearly in context. In the present document, the expressions "A or B", "at least one of A and/or B", etc. may include all available combinations of words enumerated together. The expressions "1st", "2nd", "first", "second", etc. may modify corresponding constituent elements irrespective of order and/or importance, and are just used to distinguish one constituent element from another constituent element and do not limit the corresponding constituent elements. When it is mentioned that any (e.g., 1st) constituent element is "(operatively or communicatively) coupled with/to" or is "connected to" another (e.g., 2nd) constituent element, the any constituent element may be directly coupled to another constituent element, or be coupled through a further constituent element (e.g., a third constituent element).

The expression "configured (or set) to~" used in the present document may be used interchangeably with, for example, "suitable for~", "having the capacity to~", "designed to~", "adapted to~", "made to~", or "capable of~" in a hardware or software manner in accordance to circumstances. In any situation, the expression "device configured to~" may represent that the device is "capable of~" together with other devices or components. For example, the phrase "processor configured (or set) to perform A, B and C" may represent an exclusive processor (e.g., embedded processor) for performing a corresponding operation, or a generic-purpose processor (e.g., a central processing unit (CPU) or an application processor (AP)) capable of performing corresponding operations by executing one or more software programs stored in a memory device.

An electronic device according to various embodiments of the present document may, for example, include at least one of a smartphone, a tablet personal computer (PC), a mobile phone, a video phone, an electronic book reader, a desktop PC, a laptop PC, a netbook computer, a workstation, a server, a portable digital assistant (PDA), a portable multimedia player (PMP), an Motion Picture Experts Group phase 1 or phase 2 (MPEG-1 or MPEG-2) audio layer-3 (MP3) player, a medical device, a camera or a wearable device. The wearable device may include at least one of an accessory type (e.g., a watch, a ring, a wristlet, an anklet, a necklace, glasses, a contact lens or a head-mounted-device (HMD)), a fabric or clothing integrated type (e.g., electronic clothes), a human-body mount type (e.g., a skin pad or tattoo) or a bio implantation type (e.g., an implantable circuit). According to certain embodiment, the electronic device may, for example, include at least one of a television (TV), a digital versatile disc (DVD) player, an audio system, a refrigerator, an air conditioner, a cleaner, an oven, a microwave, a washing machine, an air cleaner, a set-top box, a home automation control panel, a security control panel, a media box (for example, Samsung HomeSync™, Apple TV™ or Google TV™), a game console (e.g., Xbox™ or PlayStation™), an electronic dictionary, an electronic locking system, a camcorder or an electronic frame.

In another embodiment, the electronic device may include at least one of various medical devices (e.g., various portable medical measurement devices (e.g., a blood glucose sensor, a heat rate sensor, a blood pressure monitor, a body temperature meter, etc.), magnetic resonance angiography (MRA), magnetic resonance imaging (MRI), computed tomography (CT), a imaging equipment, an ultrasonic instrument, etc.)), a navigation device, a global navigation satellite system (GNSS), an event data recorder (EDR), a flight data recorder (FDR), a car infotainment device, an electronic equipment for ship (e.g., a vessel navigation device, a gyro compass, etc.), avionics, a security device, a car head unit, an industrial or domestic robot, a drone, an automatic teller's machine (ATM) of a financial institution, point of sales (POS) of shops, an internet of things (IoT) device (e.g., an electric bulb, various sensors, a sprinkler device, a fire alarm, a thermostat, a streetlight, a toaster, an exerciser, a hot water tank, a heater, a boiler, etc.).

According to certain embodiment, the electronic device may include at least one of a part of furniture, a building/structure or a car, an electronic board, an electronic signature receiving device, a projector or various metering devices (e.g., tap water, electricity, gas, radio wave metering devices or the like). In various embodiments, the electronic device may be flexible, or be a combination of two or more of the aforementioned various devices. The electronic device according to an embodiment of the present document is not limited to the aforementioned devices. In the present document, the term 'user' may denote a person who uses the electronic device or a device (e.g., an artificial-intelligent electronic device) which uses the electronic device.

FIG. 1 illustrates a network environment including an electronic device according to various embodiments of the disclosure.

FIG. 1 illustrates an electronic device 101 in a network environment 100 according to various embodiments of the disclosure. The electronic device 101 may include a bus 110, a processor 120 (a processor including processing circuitry), a memory 130, an input/output interface 150, a display 160, and a communication interface 170. In some embodiments, at least one of the components may be omitted, or additional components may be further included in the electronic device 101.

The bus 110 may include a circuit that connects the components 110 to 170 to each other and delivers communications (e.g., control messages or data) between the components.

The processor 120 may include one or more of a central processing unit (CPU), an application processor (AP), and a communication processor (CP). The processor 120 may control, for example, at least one different component of the electronic device 101, and/or may perform operations relating to control and/or communication or data processing. The processing (or control) operations of the processor 120 according to various embodiments will be described in detail with reference to the following drawings.

The memory 130 may include volatile and/or nonvolatile memory. The memory 130 may store, for example, a command or data related to at least one different component of the electronic device 101. According to one embodiment, the memory 130 may store software and/or a program 140. The program 140 may include, for example, a kernel 141, middleware 143, an application programming interface (API) 145, and/or an application (or "app") 147. At least part of the kernel 141, the middleware 143, and the API 145 may be designated as an operating system (OS).

The memory 130 may store one or more programs executed by the processor 120, and may function to temporarily store input/output data. The input/output data may include, for example, video, images (e.g., picture), a vibration pattern, or audio files. According to various embodiments, the memory 130 may serve to store obtained data, wherein data obtained in real time may be stored in a temporary storage device (e.g., a buffer) and data determined to be stored may be stored in a long-term storage device. The memory 130 may include a computer-readable recording medium that records a program for the processor 120 to implement a method according to various embodiments.

The kernel 141 may control or manage system resources (e.g., the bus 110, the processor 120, the memory 130, or the like) used to perform an operation or function implemented in other programs (e.g., the middleware 143, the API 145, or the application 147). Further, the kernel 141 may provide an interface that allows the middleware 143, the API 145, or the application 147 to access individual components of the electronic device 101 to thereby control or manage system resources.

The middleware 143 may serve as a relay so that, for example, the API 145 or the application 147 communicates with the kernel 141 to exchange data. Further, the middleware 143 may process one or more requests for operation received from the application 147 according to the priority thereof. For example, the middleware 143 may assign at least one application 147 a priority for using a system resource of the electronic device 101 (e.g., the bus 110, the processor 120, the memory 130, or the like), and may process the one or more requests for operations.

The API 145 is an interface for the application 147 to control a function provided from the kernel 141 or the middleware 143, and may include, for example, at least one interface or function (e.g., an instruction) for file control, window control, image processing, or character control.

The input/output interface 150 may deliver a command or data, which is input from, for example, a user or an external device, to a different component(s) of the electronic device 101, or may output a command or data, which is received from a different component(s) of the electronic device 101, to the user or to the external device. For example, the input/output interface 150 may include a wired/wireless headphone port, an external charger port, a wired/wireless data port, a memory card port, an audio input/output port, a video input/output port, or an earphone port.

The display 160 may include, for example, a liquid crystal display (LCD), a light-emitting diode (LED) display, an organic LED (OLED) display, an active-matrix OLED (AMOLED) display, a plastic OLED (POLED), a microelectro-mechanical systems (MEMS) display, or an electronic paper display. The display 160 may display, for example, various types of content (e.g., text, an image, a video, an icon, and/or a symbol) for the user. The display 160 may include a touch screen and may receive touch, gesture, proximity, or hovering input using, for example, an electronic pen or a body part of a user.

The display 160 may show, for example, a visual output to the user. The visual output may be present in the form of text, graphic, video, or combinations thereof. The display 160 may display (output) various pieces of information processed in the electronic device 101. For example, the display 160 may display a user interface (UI) or a graphical user interface (GUI) associated with the use of the electronic device 101. According to various embodiments, the display 160 may display various UIs (or GUIs) associated with operations performed by the electronic device 101 (e.g., a content display operation, an augmented reality (AR) screen display operation, or an information card output operation).

In various embodiments, the display 160 may include a flat plane display or a curved display (or a bendable display) that can be curved, bent, or rolled without damage due to a thin and flexible substrate like paper. The curved display may be fastened to a housing (or a bezel or a body) and may maintain a curved shape. In various embodiments, the electronic device 101 may be configured as a display device that can be bent and unbent freely, such as a flexible display including a curved display.

In various embodiments, the display 160 may have flexibility to be bent and unbent because a glass substrate, enclosing liquid crystals in an LCD, an LED display, an OLED display, or an AMOLED display, is being replaced with a plastic film. In various embodiments, the display 160 may extend to at least one side (e.g., at least one of the left, right, top, and bottom sides) of the electronic device 101 so that the curved display may be fastened to a side of the housing, being bent with an operable radius of curvature (e.g., 5 cm, 1 cm, 7.5 mm, 5 mm, or 4 mm).

The communication interface 170 may establish communication, for example, between the electronic device 101 and an external device (e.g., a first external electronic device 102, a second external electronic device 104, or a server 106). For example, the communication interface 170 may be connected to a network 162 via wireless communication or wired communication in order to communicate with the external device.

The wireless communication may include cellular communication using, for example, at least one of long-term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM).

According to one embodiment, the wireless communication may include an element 164 illustrated in FIG. 1, which is, for example, at least one of wireless fidelity (Wi-Fi), light fidelity (Li-Fi), wireless gigabit alliance (WiGig), Bluetooth, bluetooth low energy (BLE), ZigBee, near-field communication (NFC), magnetic secure transmission (MST), radio frequency (RF), and a body area network (BAN).

According to one embodiment, the wireless communication may include a global navigation satellite system (GNSS). The GNSS may be, for example, a global positioning system (GPS), a GNSS, a BeiDou navigation satellite system (hereinafter, "BeiDou"), or Galileo, which is the European global satellite-based navigation system. In the document, "GPS" may be interchangeably used with "GNSS" hereinafter.

The wired communication may include, for example, at least one of universal serial bus (USB), high-definition multimedia interface (HDMI), recommended standard 232 (RS-232), power line communication (PLC), and plain old telephone service (POTS).

The network 162 may include a telecommunications network, which may be, for example, at least one of a computer network (e.g., a local area network (LAN) or wide area network (WAN)), the Internet, and a telephone network.

Each of the first external electronic device 102 and the second external electronic device 104 may be a device of a type that is the same as, or different from, that of the electronic device 101. According to various embodiments, all or some of the operations performed in the electronic device 101 may be performed in one electronic device or a plurality of external devices (e.g., the electronic devices 102 and 104 or the server 106).

According to one embodiment, when the electronic device 101 needs to perform a function or service automatically or upon request, the electronic device 101 may request another electronic device (e.g., the electronic device 102 or 104, or the server 106) to perform at least some functions related to the function or service, instead of, or in addition to, autonomously performing the function or service. The other electronic device (e.g., the electronic device 102 or 104, or the server 106) may perform the requested functions or additional functions and may transmit the result thereof to the electronic device 101. The electronic device 101 may provide the requested function or service using the same received result or after additionally processing the result. To this end, cloud-computing, distributed-computing, or client-server-computing technologies may be used.

The server 106 may include, for example, at least one of an integration server, a provider server (or a wireless carrier server), a content server, an Internet server, a cloud server, a web server, a location-information-providing server, an information search server, a secure server, and a certification server.

Figure 2:
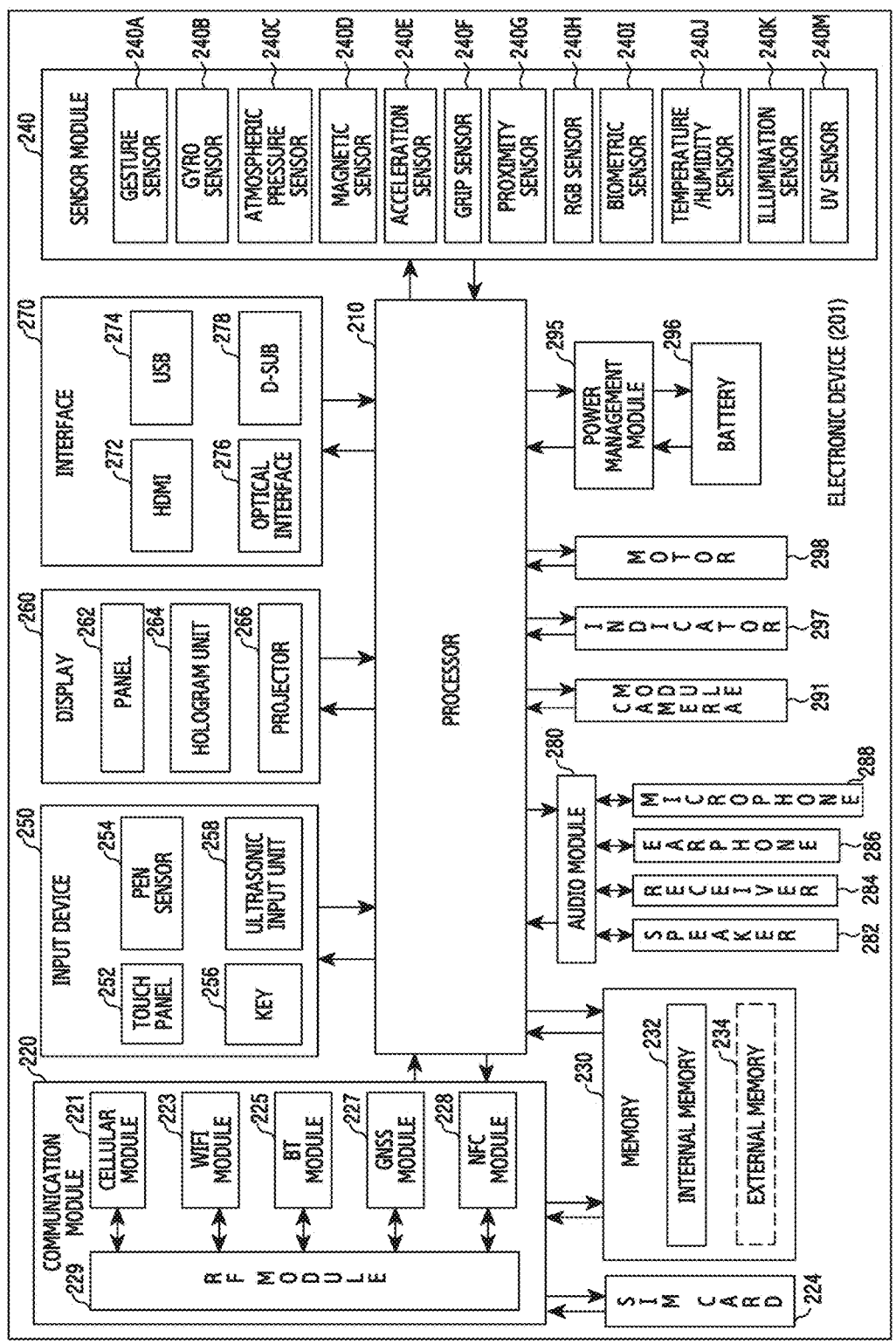
FIG. 2 is a block diagram of an electronic device according to various embodiments of the disclosure.

FIG. 2 is a block diagram of an electronic device according to various embodiments the disclosure.

The electronic device 201 may include, for example, all or part of the electronic device 101 illustrated in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298 (e.g., a vibration motor).

In various embodiments, since components illustrated in FIG. 2 should not be interpreted as essential elements, the electronic device 201 may be embodied using more components or fewer components than the components illustrated in FIG. 2. For example, the electronic device 201 according to various embodiments may not include some components depending on the type thereof. According to various embodiments, the aforementioned components of the electronic device 201 may be mounted on a housing (or a bezel or a body) of the electronic device 201, or may be formed on the outside of the electronic device 201.

The processors 210 may run, for example, an OS or an application to control a plurality of hardware or software components that are connected to the processors 210, and may perform various kinds of data processing and operations. The processors 210 may be configured, for example, as a system on chip (SoC). According to one embodiment, the processors 210 may further include a graphic processing unit (GPU) and/or an image signal processor (ISP).

The processors 210 may include at least some (e.g., a cellular module 221) of the components illustrated in FIG. 2. The processors 210 may load a command or data received from at least one of other components (e.g., a nonvolatile memory) into a volatile memory to process the command or data, and may store resultant data in the nonvolatile memory.

In various embodiments, the processors 210 may include one or more processors. For example, the processors 210 may include a CP, an AP, an interface (e.g., general purpose input/output (GPIO)), or an internal memory, which may be provided as separate components or may be integrated on one or more integrated circuits. According to one embodiment, the AP may execute various software programs to perform different functions for the electronic device 201, and the CP may perform processing and control for voice communication and data communication. The processors 210 may serve to execute a particular software module (e.g., an instruction set) stored in the memory 230 and to perform various particular functions corresponding to the module.

In various embodiments, the processors 210 may control the overall operation of the electronic device 201. In various embodiments, the processors 210 may control hardware-module operation of the audio module 280, the interface 270, the display 260, the camera module 291, the communication module 220, the power management module 295, the sensor module 240, or the motor 298. According to various embodiments, the processors 210 may be electrically connected to the display 260, the memory 230, and/or the camera module 291 of the electronic device 201.

According to various embodiments, the processors 210 may process operations associated with grouping a plurality of contents on the same line (or in the same direction or at the same angle) in a user's view direction (or from the user's view angle) in an AR and displaying the grouped contents as an intuitive group card. According to various embodiments, the processor 210 may process an operation associated with grouping at least some of the contents on the same line based on the overlapping degree of the plurality of contents on the same line in the user's view direction (or whether the contents overlap), and arrange and display the grouped contents and the non-grouped contents as an intuitive group card and a single card.

The processing (or control) operation of the processors 210 according to various embodiments will be described in detail with reference to the following drawings.

The communication module 220 may have a configuration that is the same as, or similar to, for example, that of the communication interface 170 illustrated in FIG. 1. The communication module 220 may include, for example, a cellular module 221, a Wi-Fi module 223, a Bluetooth module 225, a GNSS module 227, an NFC module 228, and an RF module 229. Although not shown, the communication module 220 may further include, for example, a WiGig module (not shown). According to one embodiment, the Wi-Fi module 223 and the WiGig module (not shown) may be integrated into a single chip.

The cellular module 221 may provide, for example, a voice call, a video call, a text messaging service, or an Internet service through a communication network. According to one embodiment, the cellular module 221 may perform identification and authentication of the electronic device 201 in a communication network using a subscriber identity module (SIM, e.g., a SIM card) 224. According to one embodiment, the cellular module 221 may perform at least some of the functions provided by the processors 210. According to one embodiment, the cellular module 221 may include a CP. According to one embodiment, at least some (e.g., two or more) of the cellular module 221, the Wi-Fi module 223, the Bluetooth module 225, the GNSS module 227, and the NFC module 228 may be included in one integrated chip (IC) or IC package.

The RF module 229 may transmit and receive, for example, a communication signal (e.g., an RF signal). The RF module 229 may include, for example, a transceiver, a power amplifier (amp) module (PAM), a frequency filter, a low-noise amplifier (LNA), an antenna, or the like. According to another embodiment, at least one of the cellular module 221, the Wi-Fi module 223, the Bluetooth module 225, the GNSS module 227, and the NFC module 228 may transmit and receive an RF signal through a separate RF module.

The Wi-Fi module 223 may be a module for forming a wireless Internet connection and a wireless LAN link with an external device (e.g., another electronic device 102 or the server 106). The Wi-Fi module 223 may be installed inside or outside the electronic device 201. Wi-Fi, WiGig, WiBro, world interoperability for microwave access (WiMax), high-speed downlink packet access (HSDPA), or millimeter wave (mmWave) may be used as wireless Internet technology. The Wi-Fi module 223 may be directly connected to the electronic device 201, or may interwork with an external device (e.g., another electronic device 104) connected to the electronic device 201 through a network (e.g., the network 162, for example, a wireless Internet network), thereby transmitting various data of the electronic device 201 to the outside or receiving data from the outside. The Wi-Fi module 223 may always remain turned on, or may be turned on/off according to the configuration of the electronic device or the user input.

The Bluetooth module 225 and the NFC module 228 may be, for example, a short-range communication module for performing short-range communication. Bluetooth, BLE, radio-frequency identification (RFID), infrared communication (IrDA), ultra-wideband (UWB), ZigBee, or NFC may be used as short-distance communication technology. The short-range communication module may interwork with an external device (e.g., another electronic device 102) connected to the electronic device 201 through a network (e.g., a short-range communication network), thereby transmitting various data of the electronic device 201 to the outside or receiving data from the outside. The short-range communication module (e.g., the Bluetooth module 225 and the NFC module 228) may always remain turned on, or may be turned on/off according to the configuration of the electronic device or the user input.

The SIM 224 may include, for example, a card including a SIM or an embedded SIM, and may include unique identification information (e.g., an integrated circuit card identifier (ICCID)) or subscriber information (e.g., an international mobile subscriber identity (IMSI)).

The memory 230 (for example, the memory 130) may include, for example, an internal memory 232 or an external memory 234. The internal memory 232 may include, for example, at least one of a volatile memory (for example, a dynamic random-access memory (DRAM), a synchronous RAM (SRAM), a synchronous DRAM (SDRAM), or the like) and a nonvolatile memory (for example, a one-time Programmable read-only memory (OTPROM), a programmable ROM (PROM), an erasable and PROM (EPROM), an electrically EPROM (EEPROM), a mask ROM, a flash ROM, a flash memory, a hard drive, or a solid-state drive (SSD)). The external memory 234 may include a flash drive, for example, a compact flash (CF), a secure digital (SD), a micro-SD, a mini-SD, an extreme digital (xD), a multi-media card (MMC), a memory stick, or the like. The external memory 234 may be functionally or physically connected to the electronic device 201 through any of various interfaces.

In various embodiments, the memory 230 may store one or more programs, data, or instructions associated with grouping of a plurality of contents on the same line (or in the same direction or at the same angle) in a user's view direction (from the user's view angle). According to various embodiments, the memory 230 may store one or more programs, data, or instructions associated with the processor 210 displaying the grouped contents as a group card. According to various embodiments, the memory 230 may store one or more programs, data, or instructions associated with the processor 210 grouping at least some of the contents on the same line based on the overlapping degree of the plurality of contents on the same line in the user's view direction (or whether the contents overlap), and arranging and displaying the grouped contents and the non-grouped contents as a group card and a single card, respectively.

According to various embodiments, the memory 230 may store first information obtained by the electronic device 201 in association with an AR function and second information associated with the operation of the AR function. According to one embodiment, the first information is information associated with a real object, which includes various pieces of information, for example, a building's name, phone number, address, uniform resource locator (URL), distance from a user, map, rating, and category. According to one embodiment, the second information may include configuration information, such as configuration criteria for grouping and information about a user interaction method related to the operation of the AR function.

The memory 230 may include an extended memory (e.g., the external memory 234) or an internal memory (e.g., the internal memory 232). The electronic device 201 may operate in connection with a web storage that performs a storage function of the memory 230 on the Internet.

The memory 230 may store one or more pieces of software (or software modules). For example, a software component may be an OS software module, a communication software module, a graphic software module, a UI software module, a moving picture experts group (MPEG) module, a camera software module, or one or more application software modules. A module that is a software component can also be expressed in a set of instructions and thus is also referred to as an instruction set. A module may also be referred to as a program. In various embodiments of the disclosure, the memory 230 may include additional modules (instructions) in addition to the aforementioned modules. Some modules (instructions) may not be used as needed.

The OS software module may include various software components to control overall system operation. Control of the overall system operation may mean, for example, memory management and control, storage hardware (device) control and management, or power control and management. In addition, the OS software module may also function to facilitate communication between various pieces of hardware (devices) and software components (modules).

The communication software module may enable communication with another electronic device, such as a wearable device, a smartphone, a computer, a server, or a handheld terminal, via the communication module 220 or the interface 270. The communication software module may be configured in a protocol structure corresponding to a communication mode.

The graphic software module may include various software components for providing and displaying graphics on the display 260. In various embodiments, the term "graphic" may be inclusively used to mean text, a web page, an icon, a digital image, a video, and an animation.

The UI software module may include various software components related to a UI. For example, the UI software module may include information on how the state of the UI is changed or under what conditions the state of the UI is changed, and the like.

The MPEG module may include a software component that enables processes and functions (e.g., creation, playback, distribution, and transmission of content) related to digital content (e.g., video or audio content).

The camera software module may include a camera-related software component that enables processes and functions related to a camera.

The application module may include a web browser including a rendering engine, email, IM, word processing, keyboard emulation, an address book, a list of touch gestures, a widget, digital rights management (DRM), an iris scan, context recognition, voice recognition, a position-determining function, a location-based service, or the like. According to various embodiments, the application module may include a healthcare application (e.g., for measuring exercise or blood sugar) or an environmental-information-providing application (e.g., for providing atmospheric pressure, humidity, or temperature data). According to various embodiments, the application module may include one or more applications that arrange and provide an information card in an AR according to set criteria (e.g., AR applications).

The sensor module 240 may measure, for example, physical quantities, or may detect the state of operation of the electronic device 201 and convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (for example, a red, green, and blue (RGB) sensor), a biometric sensor (medical sensor) 240I, a temperature/humidity sensor 240J, an illumination sensor 240K, and an ultraviolet (UV) sensor 240M.

Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scan sensor, and/or a fingerprint scan sensor. The sensor module 240 may further include a control circuit to control at least one or more sensors belonging thereto. In one embodiment, the electronic device 201 may further include a processor (e.g., a low-power processor, a micro control unit (MCU), or a micro processor unit (MPU)) configured, as a part of the processors 210 or separately from the processors 210, to control the sensor module 240, thereby controlling the sensor module 240 while the processors 210 are in a sleep state.

The input device 250 may include, for example, a touch panel 252, a (digital) pen sensor 254, a key 256, or an ultrasonic input device 258.

The touch panel 252 may be, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel, or may include a separate recognition sheet. The key 256 may include, for example, a physical button, an optical key, or a keypad. The ultrasonic input device 258 may detect ultrasonic waves generated in an input tool through a microphone 288 and may identify data corresponding to the detected ultrasonic waves. According to various embodiments, the input device 250 may include an electronic pen. According to various embodiments, the input device 250 may be configured to receive a force-touch input.

The display 260 (e.g., the display 160) may include a panel 262, a hologram device 264, a projector 266, and/or a control circuit to control these components.

The panel 262 may be configured, for example, to be flexible, transparent, or wearable. The panel 262 may be formed with the touch panel 252 in one or more modules. According to one embodiment, the panel 262 may include a pressure sensor (or force sensor) to measure the strength of pressure of a user's touch. The pressure sensor may be formed with the touch panel 252 in a single body, or may be provided as one or more sensors separate from the touch panel 252.

The panel 262 may be seated in the display 260, and may sense user input in contact with or in proximity to the surface of the display 260. The user input may include a touch input or a proximity input that is made based on at least one of a single touch, a multi-touch, hovering, and an air gesture. In various embodiments, the panel 262 may receive a user input for starting an operation associated with the use of the electronic device 201, and may generate an input signal based on a user input.

The panel 262 may be configured to convert the pressure applied to a particular portion of the display 260 or a change in capacitance occurring in a particular portion of the display 260 into an electrical input signal. The panel 262 may detect the position and the area where an input tool (e.g., a user's finger or an electronic pen) comes in contact with or in proximity to the surface of the display 260. In addition, the panel 262 may be configured to detect even the pressure (e.g., a force touch) applied when a touch is input according to the applied touch method.

The hologram device 264 may display a three-dimensional image in the air using light interference. The projector 266 may project light onto a screen to display an image. The screen may be disposed, for example, inside or outside the electronic device 201.

The interface 270 may include, for example, an HDMI 272, a USB 274, an optical interface 276, or a D-subminiature (D-sub) interface 278. The interface 270 may be included, for example, in the communication interface 170 illustrated in FIG. 1. Additionally or alternatively, the interface 270 may include, for example, a mobile high-definition link (MHL) interface, an SD card/MMC interface, or an infrared data association (IrDA) interface.

The interface 270 may receive data from another electronic device or may receive power and may transmit the data or power to individual components in the electronic device 201. The interface 270 may allow data in the electronic device 201 to be transmitted to another electronic device. For example, the interface 270 may include a wired/wireless headphone port, an external charger port, a wired/wireless data port, a memory card port, an audio input/output port, a video input/output port, or an earphone port.

The audio module 280 may bidirectionally convert, for example, sound and an electrical signal. At least some components of the audio module 280 may be included, for example, in the input/output interface 150 illustrated in FIG. 1.

The audio module 280 may process sound information input or output, for example, through a speaker 282, a receiver 284, earphones 286, or the microphone 288. The audio module 280 may function to transmit an audio signal input from the processor 210 to an output device (e.g., the speaker 282, the receiver 284, or the earphone 286) and to transmit an audio signal, such as a voice, input from an input device (e.g., the microphone 288) to the processor 210. The audio module 280 may convert voice/sound data into an audible sound, and may output the audible sound through an output device under the control of the processor 210. Also, the audio module 280 may convert an audio signal, such as a voice, received from an input device, into a digital signal, and may transmit the digital signal to the processor 210.

The speaker 282 or the receiver 284 may output audio data received from the communication module 220 or stored in the memory 230. The speaker 282 or the receiver 284 may output a sound signal associated with various operations (functions) performed in the electronic device 201. The microphone 288 may receive an external sound signal and process the sound signal into electrical audio data. The microphone 288 may be implemented with various noise reduction algorithms for eliminating noise generated during the reception of an external sound signal. The microphone 288 may be responsible for input of audio streaming, such as a voice command.

The camera module 291 is a device that takes, for example, a still image and a video. According to one embodiment, the camera module 291 may include one or more image sensors (for example, a front sensor or a rear sensor), a lens, an ISP, or a flash (for example, an LED, a xenon lamp, or the like).

According to various embodiments, the camera module 291 is a configuration for supporting a photographing function of the electronic device 201. The camera module 291 may photograph any subject under the control of the processor 210, and may transmit captured data (e.g., an image) to the display 260 and the processor 210. According to various embodiments, the camera module 291 may photograph a subject in order to capture an actual image (e.g., a real object), and may transmit the captured actual image to the display 260 so that an AR screen is displayed on the display 260.

According to various embodiments, the camera module 291 may include, for example, a first camera (e.g., a color (RGB) camera) to obtain color information and a second camera (e.g., an infrared (IR) camera) to obtain depth information (e.g., location information or distance information on a subject). According to one embodiment, the first camera may be a front camera provided on the front of the electronic device 201. According to various embodiments, the front camera may be replaced by the second camera, and the first camera may not be provided on the front of the electronic device 201. According to various embodiments, the first camera may be disposed together with the second camera on the front of the electronic device 201. According to one embodiment, the first camera may be a back camera provided on the back of the electronic device 201. According to one embodiment, the first camera may be configured to include both a front camera and a back camera, which are provided on the front and the back of the electronic device 201, respectively.

The camera module 291 may include an image sensor. The image sensor may be configured as a charge-coupled device (CCD) or a complementary metal-oxide semiconductor (CMOS).

The power management module 295 may manage, for example, the power of the electronic device 201. According to one embodiment, the power management module 295 may include a power management integrated circuit (PMIC), a charger IC, or a battery or fuel gauge (or a battery gauge).

The PMIC may have wired and/or wireless charging methods. The wireless charging methods may include, for example, a magnetic-resonance method, a magnetic-induction method, or an electromagnetic-wave method. The PMIC may further include an additional circuit for wireless charging, such as a coil loop, a resonance circuit, or a rectifier. The fuel gauge may measure, for example, the remaining battery charge, the charging voltage, the current, or the temperature of the battery 296. The battery 296 may include, for example, a rechargeable battery and/or a solar battery.

The indicator 297 may display the specific state of the electronic device 201 or a component thereof (for example, the processors 210), which may be, for example, a booting state, a message state, or a charging state.

The motor 298 (e.g., a vibration motor) may convert an electrical signal into mechanical vibrations, and may generate vibrations or a haptic effect. According to various embodiments, the electronic device 201 may include a motor drive controller (not shown), and the motor 298 may be driven under the control of the motor drive controller. According to one embodiment, the processor 210 may apply a signal related to vibration generation to the motor drive controller, and the motor drive controller may output a motor drive signal corresponding to the signal received from the processor 210 to the motor 298. The motor 298 may be driven by the motor drive signal received from the motor drive controller to generate vibrations.

In various embodiments, the electronic device 201 may include various vibration generation devices (or modules) that generate vibrations, such as the motor 298. The vibration generation devices may include, for example, the motor 298, a vibrator, an actuator, or a haptic generation device. In various embodiments, the electronic device 201 may perform various operations related to vibration creation and generation using one or more vibration generation devices.

According to various embodiments, the electronic device 201 may include a mobile TV supporting device (for example, a GPU) that is capable of processing media data in accordance with, for example, digital multimedia broadcasting (DMB), digital video broadcasting (DVB), or Media-Flo™ standards.

Each element mentioned in the present document may include one or more components, and may be designated by different terms depending on the type of the electronic device. In various embodiments, an electronic device (for example, the electronic device 101 or 201) may be configured such that some elements are omitted, additional elements are further included, or some of the elements are combined into one entity, which may perform the same functions as those of the corresponding elements before combination.

Figure 3:
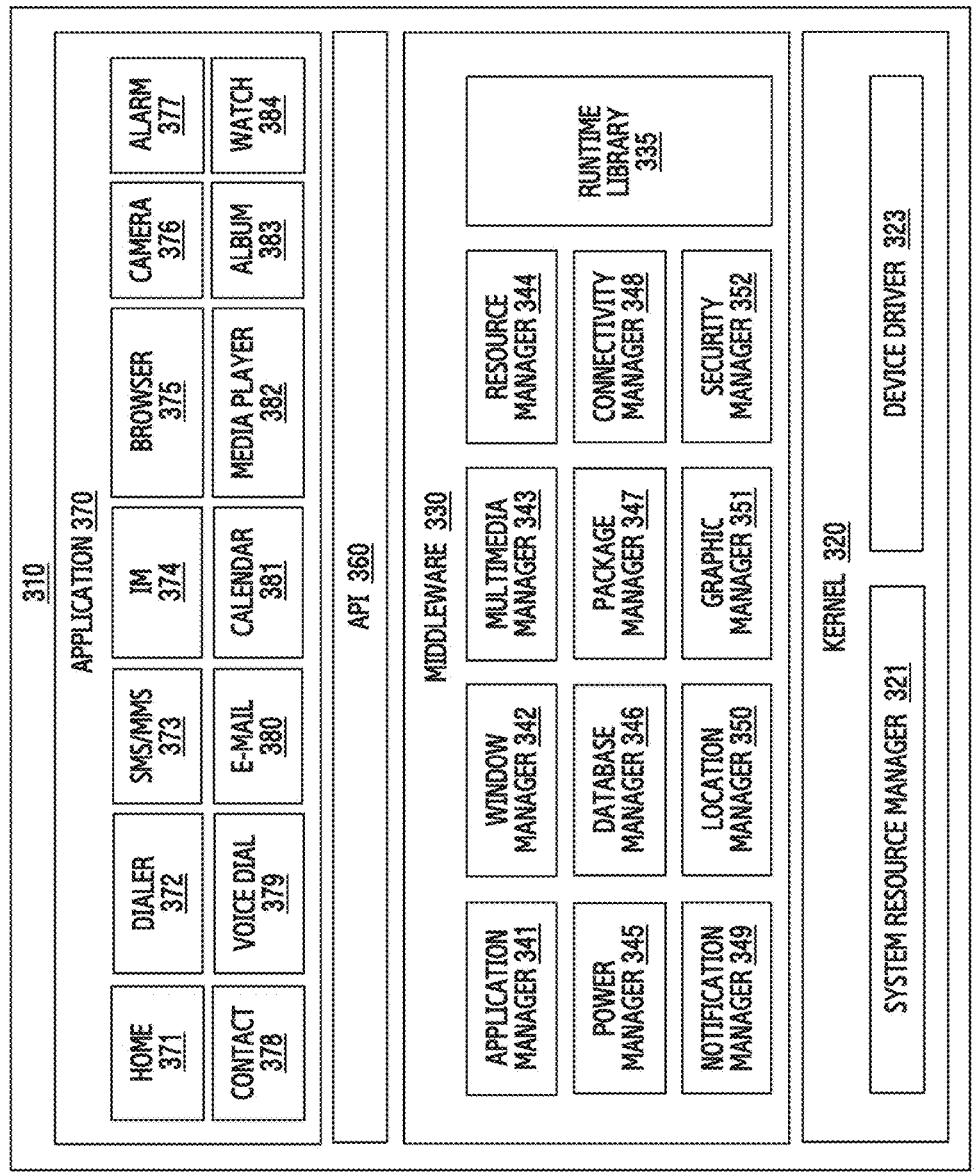
FIG. 3 is a block diagram of a program module according to various embodiments of the disclosure.

FIG. 3 is a block diagram of a program module according to an embodiment of the disclosure.

Referring to FIG. 3, a program module 310 (e.g., the program 140) may include an operating system (OS) for controlling resources related to an electronic device (e.g., the electronic device 101) and/or various applications (e.g., the application program 147) driven on the OS. The OS may, for example, include Android™, iOS™, Windows™, Symbian™, Tizen™ or Bada™. Referring to FIG. 3, the program module 310 may include a kernel 320 (e.g., the kernel 141), a middleware 330 (e.g., the middleware 143), an API 360 (e.g., the API 145), and/or an application 370 (e.g., the application program 147). At least a part of the program module 310 may be preloaded onto an electronic device, or be downloaded from an external electronic device (e.g., the electronic device 102, 104, the server 106, etc.).

The kernel 320 may, for example, include a system resource manager 321 and/or a device driver 323. The system resource manager 321 may perform control of a system resource, allocation thereof, recovery thereof or the like. According to an embodiment, the system resource manager 321 may include a process management unit, a memory management unit or a file system management unit. The device driver 323 may, for example, include a display driver, a camera driver, a Bluetooth driver, a shared memory driver, a USB driver, a keypad driver, a Wi-Fi driver, an audio driver or an inter-process communication (IPC) driver.

The middleware 330 may, for example, provide a function that the application 370 commonly needs, or provide various functions to the application 370 through the API 360 so that the application 370 may make use of restricted system resources within an electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351 or a security manager 352.

The runtime library 335 may, for example, include a library module that a compiler uses to add a new function through a programming language while the application 370 is executed. The runtime library 335 may perform input output management, memory management or arithmetic function processing.

The application manager 341 may, for example, manage a lifecycle of the application 370. The window manager 342 may manage a graphic user interface (GUI) resource used by a screen. The multimedia manager 343 may detect a format required for playing media files, and perform encoding or decoding of the media file by using a codec suitable to the corresponding format. The resource manager 344 may manage a source code of the application 370 or a space of a memory. The power manager 345 may, for example, manage a battery capacity or a power supply, and provide power information required for an operation of an electronic device. According to an embodiment, the power manager 345 may interwork with a basic input/output system (BIOS). The database manager 346 may, for example, create, search or change a database that will be used by the application 370. The package manager 347 may manage installation or updating of an application that is distributed in a form of a package file.

The connectivity manager 348 may, for example, manage wireless connectivity. The notification manager 349 may, for example, provide events such as an arrival message, an appointment, a proximity notification, etc. to a user. The location manager 350 may, for example, manage location information of an electronic device. The graphic manager 351 may, for example, manage a graphic effect that will be provided to a user, or a user interface (UI) related with this. The security manager 352 may, for example, provide system security or user authentication.

According to an embodiment, the middleware 330 may include a telephony manager for managing a voice or video telephony function of an electronic device, or a middleware module capable of forming a combination of functions of the aforementioned constituent elements. According to an embodiment, the middleware 330 may provide a module that is specialized based on the type of an OS. The middleware 330 may dynamically delete some of the existing constituent elements or add new constituent elements. The API 360 is, for example, a set of API programming functions, and may be provided to have another construction in accordance with the OS. For example, Android or iOS may provide one API set by platform, and Tizen may provide two or more API sets by platform.

The application 370 may include, for example, a home screen 371, a dialer 372, an short message service (SMS)/ multimedia messaging service (MMS) 373, instant messaging (IM) 374, a browser 375, a camera 376, an alarm 377, an address book 378, a voice dialer 379, email 380, a calendar 381, a media player 382, an album 383, and a clock 384. According to various embodiments, the application 370 may include a healthcare application (for example, for measuring exercising or blood sugar), or an environmental-information-providing application (for example, for providing atmospheric pressure, humidity, or temperature data). According to one embodiment, the application 370 may include an application that arranges and provides an information card in an AR according to set criteria.

According to an embodiment, the application 370 may include an information exchange application that may support information exchange between an electronic device and an external electronic device. The information exchange application may, for example, include a notification relay application for relaying specific information to the external electronic device, or a device management application for managing the external electronic device. For example, the notification relay application may relay notification information generated by another application of an electronic device to an external electronic device, or receive notification information from the external electronic device to provide the received notification information to a user. The device management application may, for example, install, delete or update a function (e.g., turn-on/turn-off of the external electronic device itself (or some constituent components) or adjustment of a brightness (or resolution) of a display) of the external electronic device that communicates with the electronic device, or an application operating in the external electronic device.

According to an embodiment, the application 370 may include an application (e.g., a health care application of a mobile medical instrument) designated according to an attribute of the external electronic device. According to an embodiment, the application 370 may include an application received from the external electronic device. At least a part of the program module 310 may be implemented (e.g., executed) by software, firmware, hardware (e.g., the processor 210) or a combination of at least two or more of them, and may include a module for performing one or more functions, a program, a routine, sets of instructions or a process.

The term "module" used in the present document may include a unit consisting of hardware, software or firmware and, for example, may be used interchangeably with the terms "logic", "logic block", "component", "circuit" or the like. The "module" may be an integrally configured component or the minimum unit performing one or more functions or a part thereof. The "module" may be implemented mechanically or electronically and, for example, may include an application-specific integrated circuit (ASIC) chip, field-programmable gate arrays (FPGAs) or a programmable logic device, which has been known or will be developed in future, performing some operations.

At least some of the devices (e.g., modules or functions thereof) or methods (e.g., operations) according to various embodiments may be configured as instructions stored in the form of a program module in a computer-readable storage medium (e.g., the memory 130 of FIG. 1 or the memory 230 of FIG. 2). When the instructions are executed by a processor (e.g., the processor 120 of FIG. 1 or the processor 210 of FIG. 2), the processor may perform a function corresponding to the instructions.

A computer-readable recording medium may include a hard disk, a floppy disk, a magnetic media (e.g., a magnetic tape), an optical recording media (e.g., a compact disc ROM (CD-ROM), a digital versatile disc (DVD), and magneto-optical media (e.g., a floptical disk)), an internal memory, or the like. The instructions may include code generated by a compiler or code executable by an interpreter. A module or program module according to various embodiments may include at least one or more of the aforementioned components, may omit some of the components, or may further include other components.

According to various embodiments, a recording medium may include a computer-readable recording medium that records a program for the processor 120 or 210 to implement various methods to be described.

Operations performed by a module, a program, or other components according to various embodiments may be carried out sequentially, in parallel, repeatedly, or heuristically, at least some operations may be carried out in a different order or may be omitted, or other operations may be added.

Figure 4:
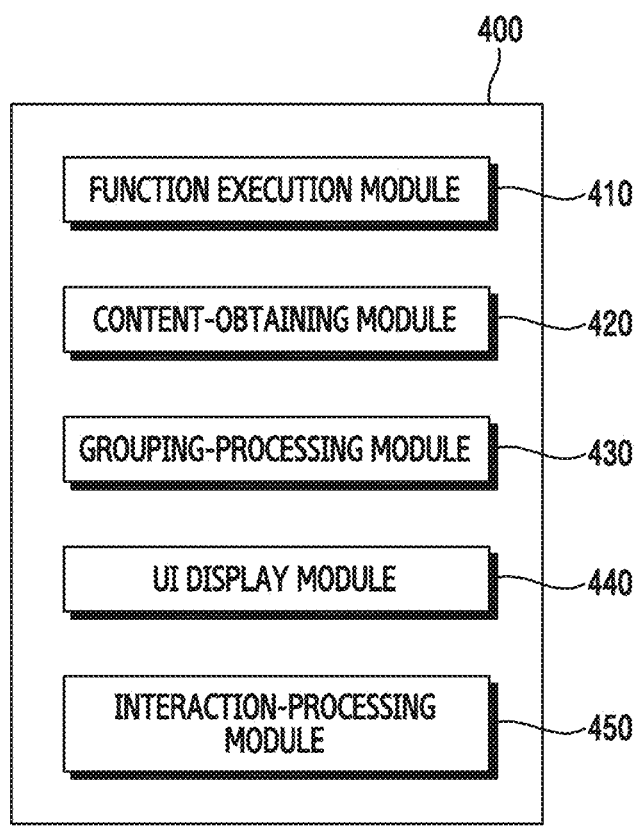
FIG. 4 illustrates an example of a function-processing module in an electronic device according to various embodiments of the disclosure.

FIG. 4 illustrates an example of a function-processing module in an electronic device according to various embodiments of the disclosure.

FIG. 4 shows an example of a function-processing module 400 that is involved in arranging information cards relating to contents mapped to a real object according to the set criterion and in providing the arranged information cards when an AR function is implemented in an electronic device (e.g., the electronic device 101 of FIG. 1 or the electronic device 201 of FIG. 2) according to various embodiments. In various embodiments, the function-processing module 400 may be included as a hardware module or a software module in a processor (e.g., the processor 120 of FIG. 1 or the processor 210 of FIG. 2, collectively referred to as the processor 210 hereinafter).

Referring to FIG. 4, the function-processing module 400 for processing an operation associated with the AR function according to various embodiments may include a function execution module 410, a content-obtaining module 420, a grouping-processing module 430, a UI display module 440, and an interaction-processing module 450.

The function execution module 410 may include a module that implements the AR function based on a request to execute an AR application from a user. According to various embodiments, the function execution module 410 may determine a view direction in which the user is currently looking (or the orientation of the electronic device, e.g., a certain angle (e.g., 15 degrees) among all directions) among all directions (e.g., 360 degrees) based on at least some of detailed information obtained by the content-obtaining module 420. According to one embodiment, the function execution module 410 may sense (or detect) information about the current location of the electronic device and the direction in which a camera (e.g., the camera module 291 of FIG. 2) is currently looking. According to various embodiments, the function execution module 410 may sense the current location of the electronic device, for example, using a GPS method and/or a location-based service (LBS) method, and may sense the direction using a digital compass. In various embodiments, the sensing result may be used to obtain detailed information on content corresponding to a real object.

The content-obtaining module 420 may include a module that obtains a real object (e.g., an actual image), location information, sensor information, content relating to the real object corresponding to a radius (e.g., 100 m, 200 m, 300 m, or 500 m) and a category set at the current location of the electronic device, and detailed information on the content when an AR application is executed. In various embodiments, the detailed information may be information associated with the real object, which includes various pieces of information, for example, a building's name, phone number, address, URL, distance from the user, map, rating, and category.

The grouping-processing module 430 may include a module that groups information cards mapped to a real object in an AR according to set criteria. The grouping-processing module 430 may group contents based on at least some of the detailed information obtained by the content-obtaining module 420, and may generate a group card corresponding to the grouped contents. According to one embodiment, the grouping-processing module 430 may process an operation associated with grouping a plurality of contents on the same line (or in the same direction or at the same angle) in a user's view direction (or from the user's view angle) in AR and generating the grouped contents as a group card. According to one embodiment, the grouping-processing module 430 may process an operation associated with grouping at least some of the contents on the same line based on the overlapping degree of the plurality of contents on the same line in the user's view direction (or whether the contents overlap on the same line), and generating the grouped contents and the non-grouped contents as a group card and a single card.

The UI display module 440 may include a module that configures and provides an AR-based UI according to various embodiments. According to one embodiment, the UI display module 440 may configure a UI that displays an actual image in an AR and includes an information card providing relevant information about the real object on the actual image. The UI display module 440 may configure a UI including an omnidirectional object that provides a content distribution (or density) relative to a real object within a specified radius in any direction (e.g., 360 degrees) and a specified category. An example of an UI according to various embodiments will be described in detail with reference to the following drawings.

The interaction-processing module 450 may include a module that processes an operation associated with various interactions about the operation of the AR function. According to one embodiment, the interaction-processing module 450 may detect a user interaction using an information card or an omnidirectional object or an interaction based on a position change of the electronic device, and may process a relevant operation (or function) based on the detected interaction. An example of an interaction and an example of an interaction-based operation according to various embodiments will be described in detail with reference to the following drawings.

According to various embodiments, when an application (e.g., an AR application) is executed by the user, the electronic device (e.g., the function-processing module 400) may obtain an actual image (e.g., a real object) in the real world through a camera (e.g., the camera module 291 of FIG. 2), may obtain location information (e.g., latitude/longitude information) on the current location of the electronic device via a location information receiver (e.g., the GNSS module 277 of FIG. 2), may obtain sensor information including information on a slope/gradient/gravity through at least one sensor, and may temporarily store the obtained information.

In various embodiments, the electronic device may obtain, based on the obtained location information, detailed information about a region or a building (e.g., a real object) located within a specified radius (e.g., 100 m, 200 m, 300 m, or 500 m) from the location of the electronic device. According to one embodiment, the electronic device may transmit the obtained location information to an external device (e.g., the server 106 of FIG. 1 or a location information system) and may receive, from the external device, detailed information on a real object located within the specified radius from the location of the electronic device. In various embodiments, the detailed information may be information associated with the real object, which includes various pieces of information, for example, a building's name, phone number, address, URL, distance from the user, map, rating, and category.

In various embodiments, the electronic device may generate an information card based on the obtained detailed information, and may display the generated information card on a real-time screen through the AR application. According to various embodiments, the electronic device can continuously obtain detailed information in real time (e.g., via real-time data communication with the location information system), and thus may sequentially provide, on the screen, detailed information about a region and surroundings thereof based on user movements.

Figure 5:
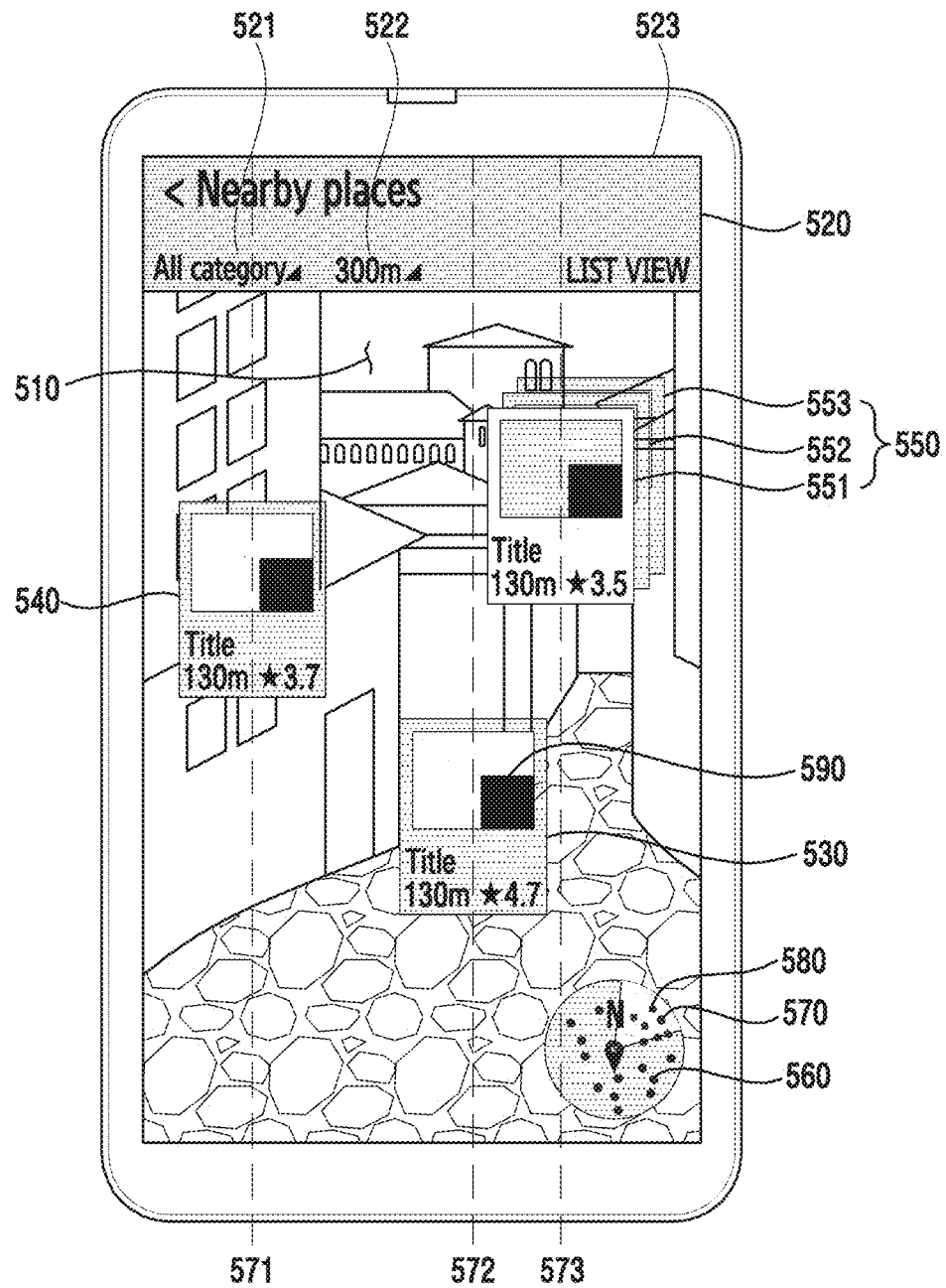
FIG. 5 illustrates an example of a user interface (UI) provided by an electronic device according to various embodiments of the disclosure.
Figure 6:
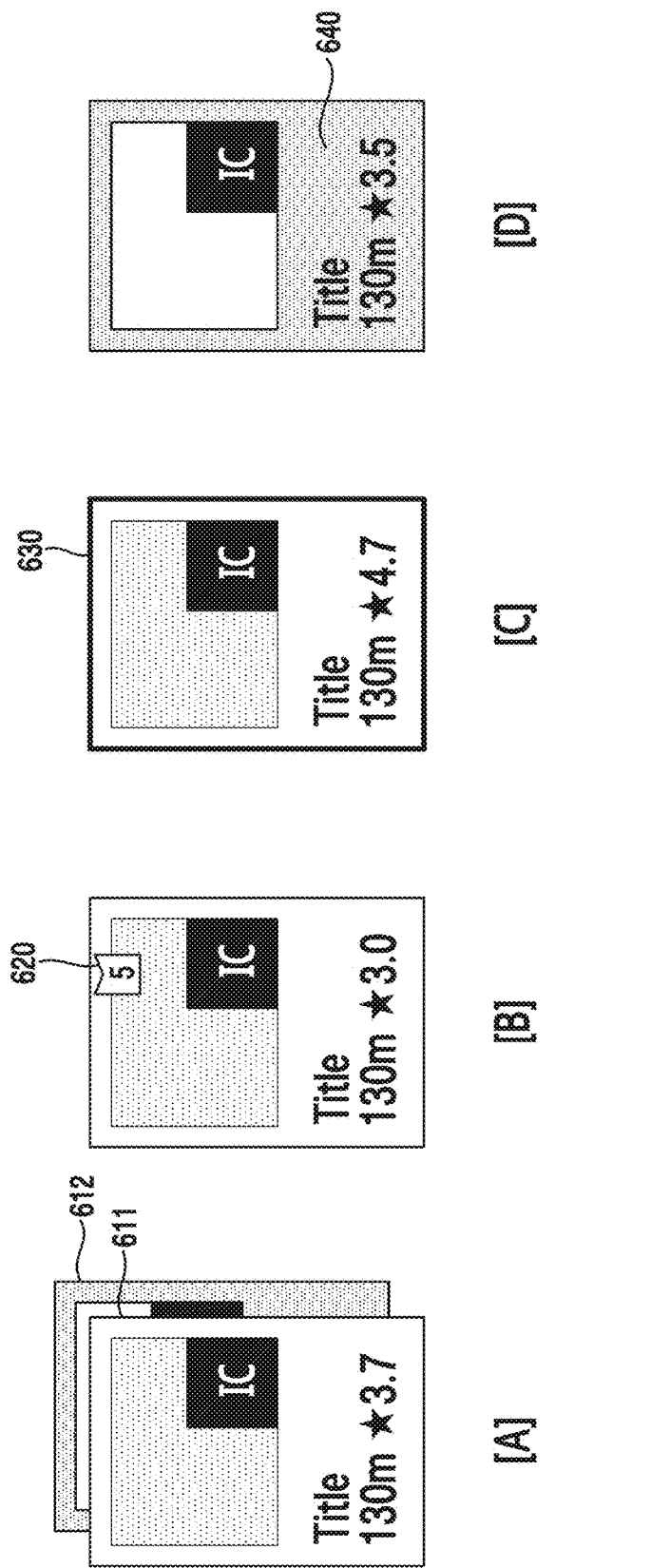
FIG. 6 illustrates an example of an information card according to various embodiments of the disclosure.

FIG. 5 illustrates an example of a UI provided by an electronic device according to various embodiments of the disclosure. FIG. 6 illustrates an example of an information card according to various embodiments of the disclosure.

Referring to FIG. 5, an AR-based UI according to various embodiments includes an AR screen 510 that displays an actual image (e.g., a real object) in an AR, a menu area 520 that is overlaid with a certain level of transparency on the AR screen 510 and provides an object related to an option selection/setting, information cards 530, 540, and 550 that provide relevant information about the real object, and an omnidirectional object 560 that provides a content distribution (or density) relative to the real object located within a specified radius in any direction (e.g., 360 degrees).

According to various embodiments, the AR screen 510 may be a real-time preview image captured via a camera.

According to various embodiments, the menu area 520 includes a first object 521 for setting a category for information providing, a second object 522 for setting an information-providing range (or radius), and a third object 523 for switching between a live view mode and a list view mode. The user may change at least one setting among a category (e.g., all, restaurant, or landmark), the radius (e.g., 100 m, 200 m, 300 m, or 500 m), and a view mode (e.g., live view or list view) based on an object (e.g., the first object 521, the second object 522, or the third object 523) displayed in the menu area 520.

According to various embodiments, the information cards 530, 540, and 550 may present a mini-window (or virtual object) in a set form (e.g., a rectangular form or a circular form) to display at least some of the information about the real object corresponding to a set category within a set radius based on the current location of the electronic device. In various embodiments, as described above, the information cards 530, 540, and 550 may be configured based on at least some of the detailed information obtained in response to the execution of an AR application. For example, the information cards 530, 540, and 550 may be generated including at least some of the detailed information obtained with respect to a real object. According to various embodiments, the electronic device may generate a card corresponding to a real object within a radius set in a view direction (or at a view angle). According to various embodiments, the electronic device may generate a card corresponding to a real object within a radius set in any direction (or at 360 degrees).

According to various embodiments, the information cards 530, 540, and 550 may be divided into first cards 530 or 540 (e.g., a single card) about a single content corresponding to the real object and a second card (e.g., a group card or multi-card) about a plurality of contents corresponding to the real object.

According to various embodiments, the electronic device may group a plurality of contents (e.g., detailed information on an individual real object) lying on the same line (or straight line) in the user's view direction. In various embodiments, the same line (or straight line) may denote a virtual z-axis based on the AR screen 510 displayed on a display of the electronic device. According to one embodiment, as indicated by elements 571, 572, and 573 in FIG. 5, it is possible to analyze whether contents lie on the same line based on a plurality of virtual z-axes.

According to various embodiments, based on the AR screen 510 displayed on the display, the z-axes 571, 572, and 573 may be divided into a plurality of sections along a horizontal axis (x-axis) according to a set criterion. For example, the electronic device may divide contents about a real object based on the z-axes 571, 572, and 573 (or z-axis sections) on the AR screen 510 displayed on the display and may group the contents based on each of the z-axes 571, 572, and 573. In various embodiments, a plurality of groups may be created for each z-axis. An example of an operation of grouping contents according to various embodiments will be described in detail with reference to the following drawings.

According to various embodiments, the electronic device may configure and provide information cards corresponding to the first cards 530 and 540 or the second card 550 for each virtual z-axis resulting from the division based on the result of grouping.

According to various embodiments, when a plurality of contents is grouped, the electronic device may generate a plurality of cards 551, 552, and 553 about the respective contents belonging to a group and may provide the generated cards 551, 552, and 553 as the second card 550 in a single group form. According to various embodiments, the electronic device may provide a particular type of second card 550 so that the user may identify that a plurality of contents located in the same direction (or at the same angle) is provided as a single group. For example, in various embodiments, the second card 550 (e.g., a group card) corresponding to the plurality of contents that can overlap according to a set criterion may be separated (distinguished) from the non-overlapping first card 530 or 540 corresponding to the single content. For example, the second card 550 (e.g., a group card) may have a different form from that of the first card 530 or 540 (e.g., a single card). An example of providing the second card 550 according to various embodiments is illustrated in FIG. 6.

Referring to FIG. 6, the second card 550 (or group card) may be configured in various forms, for example, example (A), example (B), example (C), and example (D) illustrated in FIG. 6, and may be changed by the user depending on the configuration of the electronic device.

According to an embodiment, example (A), shown as object [A] in FIG. 6, shows that single cards 611 and 612 respectively corresponding to a plurality of contents are provided in the form of one group. According to one embodiment, the electronic device may display a single card (e.g., the card 611) about a content relating to the shortest distance on the top among the single cards 611 and 612 of the group card. In various embodiments, example (A) may be an example of providing a group card in a group type.

According to an embodiment, example (B), shown as object [B] in FIG. 6, shows that the group card 550 is provided in the form of a single card and a badge object 620 indicating that the card includes a plurality of contents is provided in one area of the card. According to one embodiment, the badge object 620 may be provided based on various icons, and may include information about the number of grouped contents (for example, the number 5). In various embodiments, example (B) may be an example of providing a group card in a badge type.

Examples (C) and (D), respectively shown as objects [C] and [D] in FIG. 6, show that the group card 550 is provided in a single form, like a single card, and different effects are applied to indicate that the card includes a plurality of contents. For example, in example (C), the card is provided with a distinguished border 630 (e.g., a bold border, a border in a different color, a bright border, or the like) from that of a single card. In example D, a special effect 630 (e.g., card brightness variation, card color variation, highlighting, or the like) is applied to the card to distinguish the same from a single card. In various embodiments, examples (C) and (D) may be examples of providing a group card in a highlighting type (e.g., highlight 640 in object [D] in FIG. 6).

In various exemplary embodiments, the group card is not limited to example (A), example (B), example (C), and example (D) of FIG. 6, but may be configured using various method for distinguishing a group card.

According to various embodiments, it is possible to switch to a detailed information page according to a user interaction (e.g., a touch) relating to a group card or a single card. According to various embodiments, it is possible to switch a function (e.g., navigation) relating to cards (or contents) in a group card based on a user interaction (e.g., a touch gesture such as a swipe, a flick, or a drag) relating to the group card. According to one embodiment, the electronic device may switch the card 551, the card 552, and the card 553 in the group card 550 of FIG. 5 in order or in reverse order according to the user's touch gesture (e.g., a swipe to the left or to the right). The electronic device may display the switched card (e.g., the card 552) on the top based on such switching.

Referring back to FIG. 5, in various embodiments, the electronic device may generate and provide a first card 530 or 540 about each of non-grouped content (e.g., content not overlapping with other content on the same line).

In various embodiments, an element 590 of FIG. 5 may be an information object representing the category (or attribute) of the content or card. For example, the information object 590 may be provided in one area (e.g., an image area) of the card, and may represent the category (or attribute) based on a set text, image, or icon.

According to various embodiments, the electronic device may display the AR screen 510 on which the first cards 530 and 540 and the second card 550 are disposed on the real object. According to one embodiment, the electronic device may display, on a real object, one group card 550 corresponding to a plurality of contents on the same line and at least one single card 530 or 540 corresponding to individual non-grouped content.

In various embodiments, each card may be displayed at a corresponding position in view of the location (or distance from the user) of corresponding content. According to one embodiment, depending on the distance from the user, a card about content close to the user may be disposed at a lower area of the AR screen 510 so that the content appears to be close, and a card about content distant from the user may be disposed at an upper area of the AR screen 510 so that the content appears to be distant. For example, a card about content closer to the user may be disposed at the lower area of the AR screen 510, and a card about content farther from the user may be disposed at an upper area of the AR screen 510.

In various embodiments, each card may be displayed at different positions on a z-axis in view of the degree of overlapping with a card on another z-axis. According to one embodiment, when a middle card and a right card at least partly overlap each other on the AR screen 510, the electronic device may determine the degree of overlapping (e.g., overlapping range). When the electronic device determines that it is difficult to identify information in an overlapping card (e.g., when the cards overlap at a set degree or greater), the electronic device may move any one of the cards in a direction (e.g., upwards, downwards, rightwards, leftwards, or diagonally) so that the cards do not overlap on the AR screen 520.

In various embodiments, the position at which the group card is disposed on the AR screen 510 may be determined based on the position of a card disposed on the top in the group card or content relating to the shortest distance in a group of contents.

According to various embodiments, the cards 530, 540, and 550 may be provided such that user-preferred content (or content related to a landmark) is distinguished. According to one embodiment, as indicated by an element 540, the card may be highlighted. According to various embodiments, the cards 530, 540, and 550 may be configured at a position mapped to a real object corresponding to content in the AR screen 510. According to one embodiment, a card related to content of a specific real object (e.g., a department store building) may be provided on the AR screen 510, being mapped to (e.g., combined or composed with) the real object (e.g., the department store building).

According to various embodiments, the UI may further include the omnidirectional object 560 that provides content distribution (or density) relative to a real object within a set radius in any direction (e.g., 360 degrees). In various embodiments, as illustrated in FIG. 5, the omnidirectional object 560 may be overlaid (or float) with a specified level of transparency in a certain area (e.g., the bottom right area) on the AR screen 510.

In various embodiments, the omnidirectional object 560 may provide a direction object 570 to indicate the user's view direction (e.g., view angle) in any direction (e.g., 360 degrees). The direction object 570 may be provided in the omnidirectional object 560 so as to distinguish the view direction by a certain angle (e.g., 15 degrees) from any direction.

In various embodiments, the omnidirectional object 560 may include an information object (e.g., a dot icon) for general information on the density, orientation, and/or distance of a real object corresponding to a set category within a radius set based on the current location of the electronic device. For example, assuming that thirty (30) contents are retrieved and provided, thirty (30) information objects 580 may be provided in the omnidirectional object 560 and may be distributed corresponding to directions and positions thereof in the omnidirectional object 560. According to various embodiments, the information object 580 displayed in the direction object 570 may correspond to content corresponding to the view direction. According to various embodiments, the number and position of information objects 580 displayed in the direction object 570 may correspond to the number and position of pieces contents associated with a card displayed on the AR screen 510.

As described above, an electronic device according to various embodiments may include: a camera module (e.g., the camera module 291 of FIG. 2); a display (e.g., the display 160 of FIG. 1 or the display 260 of FIG. 2) to display an AR screen; and a processor (e.g., the processor 120 of FIG. 1 or the processor 210 of FIG. 2) functionally connected to the camera module 291 and the display 160 or 260, wherein the processor 120 or 210 may be configured to: implement an AR function; determine a plurality of contents according to a set criterion in a view direction of a user; group the plurality of contents into at least one group; generate a group card corresponding to a plurality of contents and a single card corresponding to a single content based on a grouping result; and display the group card and the single card mapped to a real object on the AR screen.

According to various embodiments, the set criterion may include a criterion related to the same direction, the same line, or the same angle in the view direction.

According to various embodiments, the set criterion may be set based on at least one z-axis in the view direction.

According to various embodiments, the processor may be configured to: obtain detailed information related to the real object in response to implementation of the AR function; determine a plurality of contents based on the set criterion in the view direction based on at least some of the detailed information; group a plurality of contents and generate the group card corresponding to the grouped contents when there is a plurality of pieces contents according to the set criterion; and generate the single card corresponding to a single content when there is a single content according to the set criterion.

According to various embodiments, the processor may be configured to generate the group card in any one type among a group type of displaying a plurality of information cards corresponding to individual contents belonging to a plurality of contents as one group, a badge type including a badge object indicating information on the number of grouped contents, and a highlighting type of displaying the group card based on an effect for distinguishing the group card from the single card.

According to various embodiments, the processor may be configured to group all of the plurality of contents corresponding to the set criterion in the view direction.

According to various embodiments, the processor may be configured to group at least some contents among the plurality of contents corresponding to the set criterion based on an overlapping degree of the plurality of contents corresponding to the set criterion in the view direction.

According to various embodiments, the processor may be configured to: display a detail page associated with a plurality of contents grouped based on a first user interaction by the group card; and switch to and display an information card displayed by the group card based on a second user interaction by the group card.

According to various embodiments, the processor may be configured to display a user-location map based on an interaction related to a state change of the electronic device.

According to various embodiments, the map may be a map obtained by capturing a certain range based on a user location and by providing the range as an image.

Hereinafter, an operation method according to various embodiments of the disclosure will be described with reference to the accompanying drawings. It should be noted, however, that various embodiments of the disclosure are not limited or restricted by the following details, and thus the disclosure can be applied to various embodiments based on the following description. In various embodiments of the disclosure to be described below, hardware approaches will be illustrated by way of example. However, various embodiments of the disclosure encompass techniques using both hardware and software, and thus are not to be construed as excluding a software-based approach.

Figure 7:
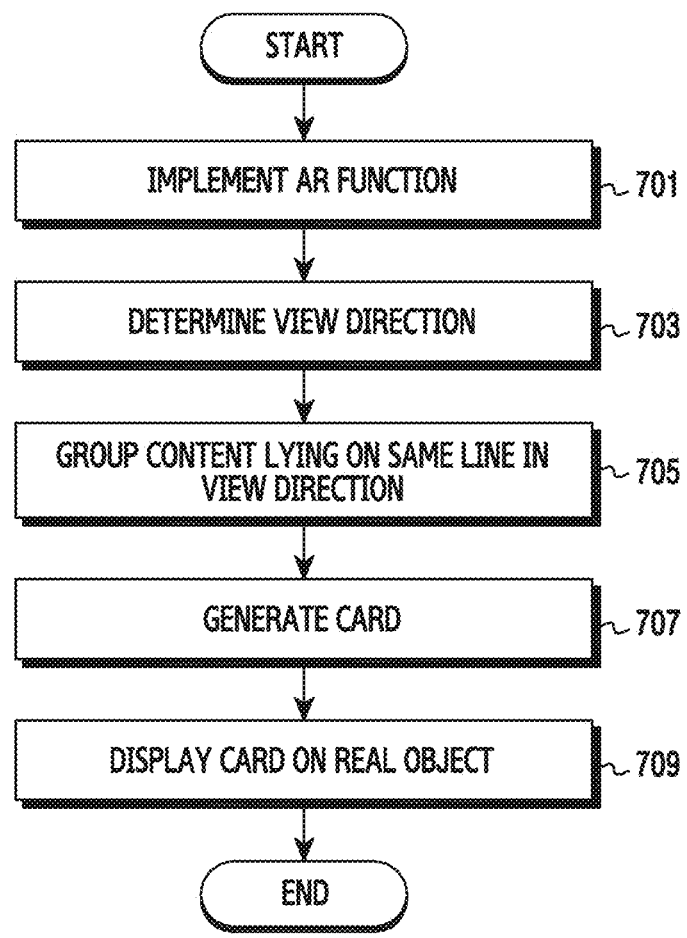
FIG. 7 is a flowchart illustrating an operation method of an electronic device according to various embodiments of the disclosure.

FIG. 7 is a flowchart illustrating an operation method of an electronic device according to various embodiments of the disclosure.

Referring to FIG. 7, in operation 701, a processor (e.g., one or more processors including processing circuitry, for example, the processor 120 of FIG. 1 or the processor 210 of FIG. 2, collectively referred to as the processor 210 hereinafter) of the electronic device (e.g., the electronic device 101 of FIG. 1 or the electronic device 201 of FIG. 2) may implement an AR function. According to one embodiment, the processor 210 may process the implementation of the AR function based on a request to execute an AR application from a user.

In operation 703, the processor 210 may determine a view direction (or view angle). According to one embodiment, as described above, when the AR application is executed, the processor 210 may obtain a real object (e.g., an actual image), location information, sensor information, and detailed information on the real object within a radius (e.g., 100 m, 200 m, 300 m, or 500 m) set from the current location of the electronic device. The processor 210 may determine the view direction, in which the user is currently looking (or the orientation of the electronic device, e.g., a certain angle (e.g., 15 degrees) among all directions), among all directions (e.g., 360 degrees) based on at least some of the obtained detailed information.

In operation 705, the processor 210 may group contents (e.g., detailed information on an individual real object) lying on the same line (or straight line) in the determined view direction. In various embodiments, the same line (or straight line) may denote a z-axis based on a screen displayed on a display of the electronic device. In various embodiments, based on the screen displayed on the display, the z-axis may be divided into a plurality of sections along a horizontal axis (x-axis) according to a set criterion. For example, the processor 210 may divide contents about a real object based on the z-axis on the screen displayed on the display and may group the contents based on each z-axis (e.g., each z-axis section). For example, a plurality of groups may be created for each z-axis.

In operation 707, the processor 210 may generate a card (or window). In various embodiments, the card may be an information card that provides information associated with a real object provided in an AR. According to one embodiment, the information card may be generated including at least part of detailed information obtained with respect to a real object. According to various embodiments, the processor 210 may generate a card corresponding to a real object within a radius set based on the view direction (or any direction). According to various embodiments, for grouped contents, the processor 210 may generate a plurality of cards about the respective contents in a group or may generate a single card in a particular form so that the user may identify that a plurality of contents is provided in a single group. According to various embodiments, for non-grouped contents, the processor 210 may generate a card for each content.

In operation 709, the processor 210 may display, on the display, an AR screen on which the card is disposed on the real object. According to one embodiment, the processor 210 may overlap cards corresponding to a plurality of contents on the same line to be provided as a group card (or multi-card) on the real object, and may display a card about a content relating to the shortest distance on the top. According to one embodiment, the processor 210 may display a single group card corresponding to a plurality of contents on the same line on the real object. According to various embodiments, the processor 210 may display, on the AR screen, at least one first card (e.g., group card) corresponding to a group of grouped contents and at least one second card (e.g., single card) corresponding to individual non-grouped contents based on the distance. According to various embodiments, when displaying the AR screen including the card, the processor 210 may provide a set UI (e.g., the UI illustrated in FIG. 5) including different components.

Figure 8:
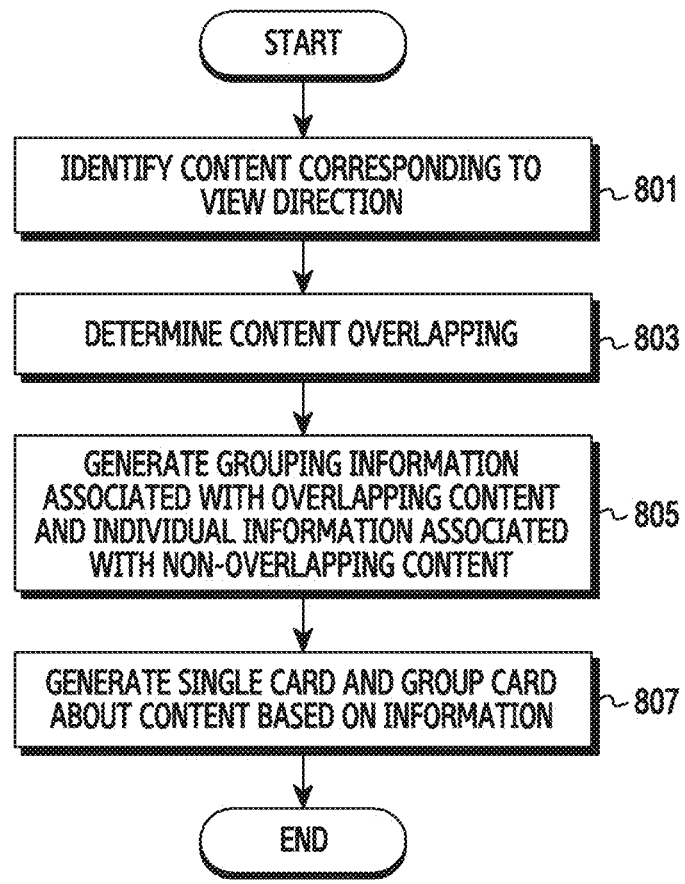
FIG. 8 is a flowchart illustrating an operation method of an electronic device according to various embodiments of the disclosure.

FIG. 8 is a flowchart illustrating an operation method of an electronic device according to various embodiments of the disclosure.

FIG. 8 shows an example of generating a card based on whether content overlaps according to various embodiments of the disclosure.

In operation 801, the processor 210 of the electronic device may identify content corresponding to a view direction.

In operation 803, the processor 210 may determine whether the content overlaps. According to one embodiment, the processor 210 may determine whether there are contents (e.g., detailed information on an individual real object) lying on the same line (or straight line) among the contents identified in operation 801.

In operation 805, the processor 210 may generate grouping information associated with overlapping content and individual information associated with non-overlapping content. According to one embodiment, the processor 210 may distinguish contents based on a plurality of set z-axes among a plurality of contents corresponding to at least part of a real object in the view direction. The processor 210 may distinguish at least one first z-axis, on which contents overlap (e.g., the state in which a plurality of contents lies along the same line), from at least one second z-axis, on which contents do not overlap (e.g., one content lies along a line), based on z-axis contents. The processor 210 may generate grouping information for generating a group card by grouping contents on the at least one first z-axis, and may generate individual information for generating at least one single card about content on the at least one second z-axis.

In operation 807, the processor 210 may generate at least one of a single card and a group card associated with the content based on the generated information. According to one embodiment, the processor 210 may generate a group card based on the grouping information, and may generate a single card based on the individual information. According to one embodiment, the processor 210 may determine information on the arrangement of the generated group card and/or single card (e.g., a card display position based on the location of a real object) on an AR screen based on the information (e.g., the grouping information or the individual information). According to various embodiments, when generating the grouping information or the individual information, the processor 210 may determine user preferences (or landmarks) based on the content and may include preference information in the grouping information or the individual information.

Figure 9:
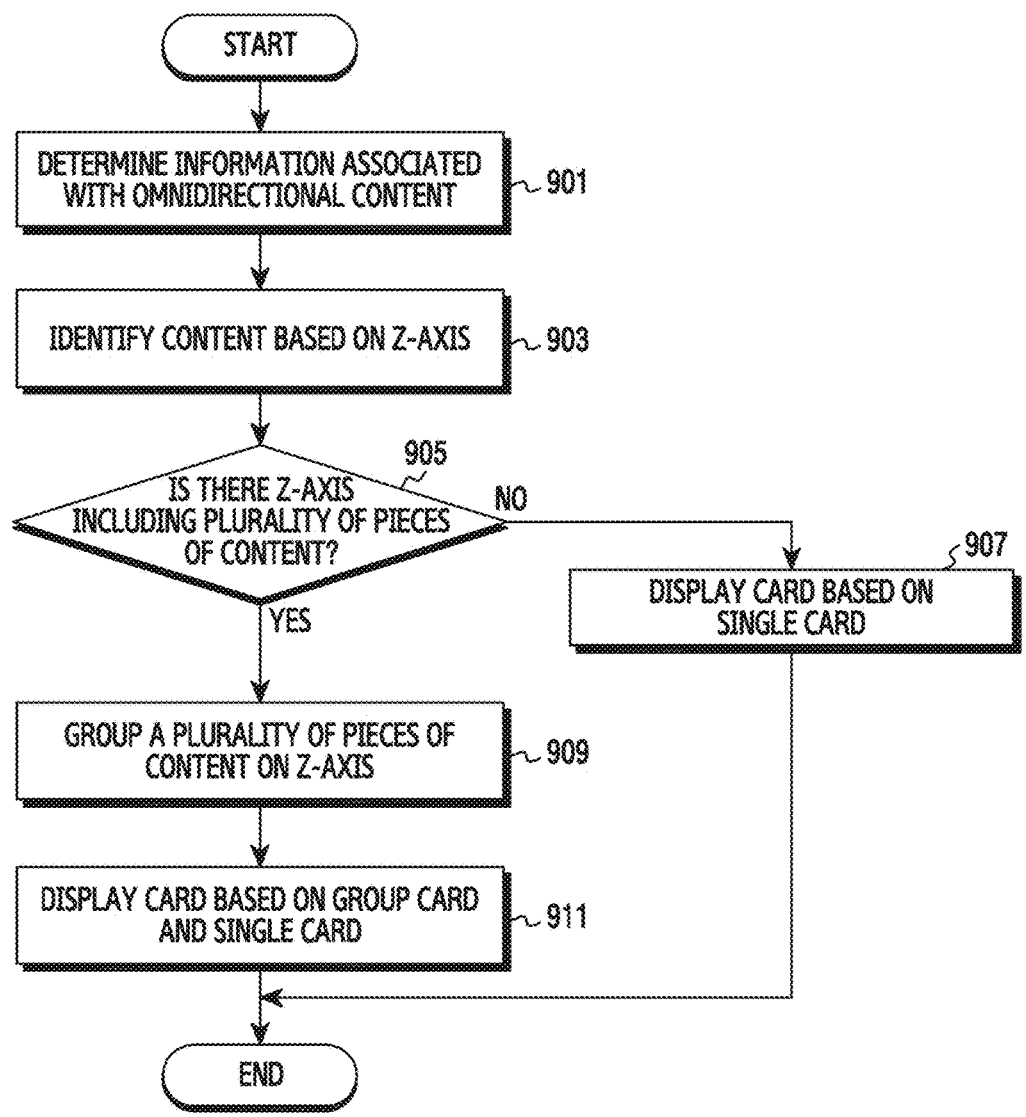
FIG. 9 is a flowchart illustrating an operation method of an electronic device according to various embodiments of the disclosure.

FIG. 9 is a flowchart illustrating an operation method of an electronic device according to various embodiments of the disclosure.

FIG. 9 shows an example in which a plurality of contents on the same line is grouped and provided in a group card on an AR screen according to various embodiments of the disclosure.

In operation 901, a processor 210 of the electronic device may determine information associated with omnidirectional contents. According to various embodiments, as described above, when an AR application is executed, the processor 210 may obtain a real object (e.g., an actual image), location information, sensor information, and detailed information on the real object in a radius (e.g., 100 m, 200 m, 300 m, or 500 m) and a category set at the current location of the electronic device. The processor 210 may determine at least one obtained piece of detailed information.

In operation 903, the processor 210 may identify content based on a z-axis. According to one embodiment, the processor 210 may determine content (e.g., detailed information on an individual real object) lying on the same line (or straight line) in a view direction. In various embodiments, the same line (or straight line) may denote the z-axis based on an AR screen displayed on a display of the electronic device. According to one embodiment, the processor 210 may determine contents based on the z-axis among a plurality of contents corresponding to at least part of the real object in the view direction.

In operation 905, the processor 210 may determine whether there is a z-axis including a plurality of contents. According to one embodiment, the processor 210 may distinguish at least one first z-axis, on which there is a plurality of contents (e.g., a plurality of contents on the same line), from at least one second z-axis, on which there is a single content (e.g., one content on a line).

When it is determined that there is no z-axis including a plurality of contents in operation 905 (no in operation 905), the processor 210 may process the display of a card based on a single card in operation 907. According to one embodiment, for non-grouped contents, the processor 210 may generate one card per content.

When it is determined that there is a z-axis including a plurality of contents in operation 905 (yes in operation 905), the processor 210 may group the plurality of contents on the z-axis in operation 909. According to one embodiment, the processor 210 may group contents by each of at least one z-axis on which a plurality of contents lies.

In operation 911, the processor 210 may process the display of a card based on a group card and a single card. According to one embodiment, the processor 210 may generate a single card corresponding to non-grouped content and a group card corresponding to grouped contents. According to various embodiments, when there is no non-grouped content, the processor 120 may process the display of a card based on a group card. According to various embodiments, when there is a plurality of z-axes on which a plurality of contents lies, the processor 210 may generate a separate group card for each of the plurality of z-axes.

Figure 10:
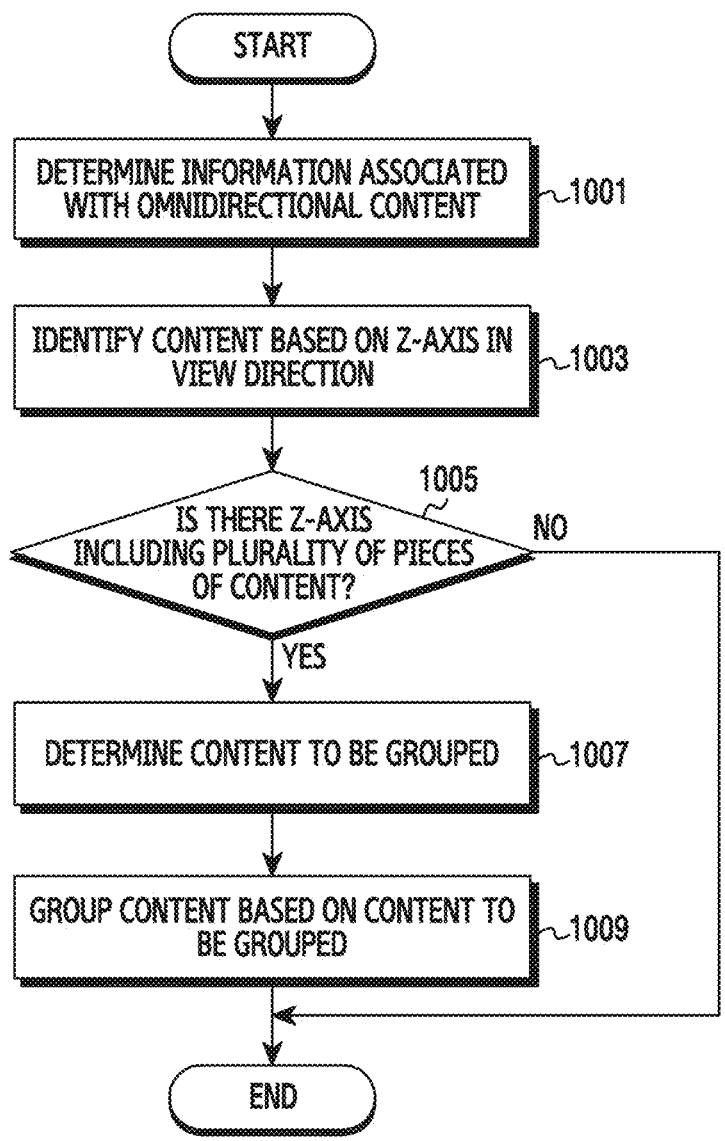
FIG. 10 is a flowchart illustrating an operation method of an electronic device according to various embodiments of the disclosure.

FIG. 10 is a flowchart illustrating an operation method of an electronic device according to various embodiments of the disclosure.

FIG. 10 shows an example according to various embodiments in which contents to be grouped are determined from among a plurality of contents on the same line on an AR screen depending on whether the contents overlap, a group card is generated by grouping only at least some contents corresponding to cards that can be overlapped among the plurality of contents on the same line, a single card corresponding to a non-overlapping card is generated, and the group card and the single card are provided together, even on the same line.

In operation 1001, a processor 210 of the electronic device may determine information associated with omnidirectional contents. According to various embodiments, as described above, when an AR application is executed, the processor 210 may obtain a real object, location information, sensor information, and detailed information on the real object in a radius and a category set at the current location of the electronic device.

In operation 1003, the processor 210 may identify content based on a z-axis in a view direction. According to one embodiment, the processor 210 may determine contents (e.g., detailed information on an individual real object) lying on the same line in the view direction. In various embodiments, the same line (or straight line) may denote the z-axis based on an AR screen displayed on a display of the electronic device. According to one embodiment, the processor 210 may determine contents based on the z-axis among a plurality of contents corresponding to at least part of the real object in the view direction.

In operation 1005, the processor 210 may determine whether there is a z-axis including a plurality of contents. According to one embodiment, the processor 210 may determine at least one z-axis on which there is a plurality of contents (e.g., a plurality of contents on the same line).

When it is determined that there is no z-axis including a plurality of contents in operation 1005 (no in operation 1005), the processor 210 may perform an operation related to the generation of a single card without performing a grouping operation.

When it is determined that there is a z-axis including a plurality of contents in operation 1005 (yes in operation 1005), the processor 210 may determine contents to be grouped among the plurality of contents in operation 1007. According to one embodiment, the processor 210 may distinguish at least some contents corresponding to cards that can be overlapped among the plurality of contents on the z-axis including the plurality of contents. In various embodiments, the processor 210 may determine whether the contents overlap using the obtained detailed information (e.g., distance, location, or the like). According to one embodiment, the processor 210 may determine whether there is non-overlapping content among the plurality of contents on the z-axis. When there is non-overlapping content, the processor 210 may perform at least one grouping operation based on overlapping contents excluding the non-overlapping content.

In operation 1009, the processor 210 may group contents based on the determined contents to be grouped. According to various embodiments, the processor 210 may group only the contents to be grouped among the plurality of contents on the z-axis and may perform a plurality of grouping operations depending on overlapping of the contents to be grouped, an example of which is illustrated in FIG. 11.

Figure 11:
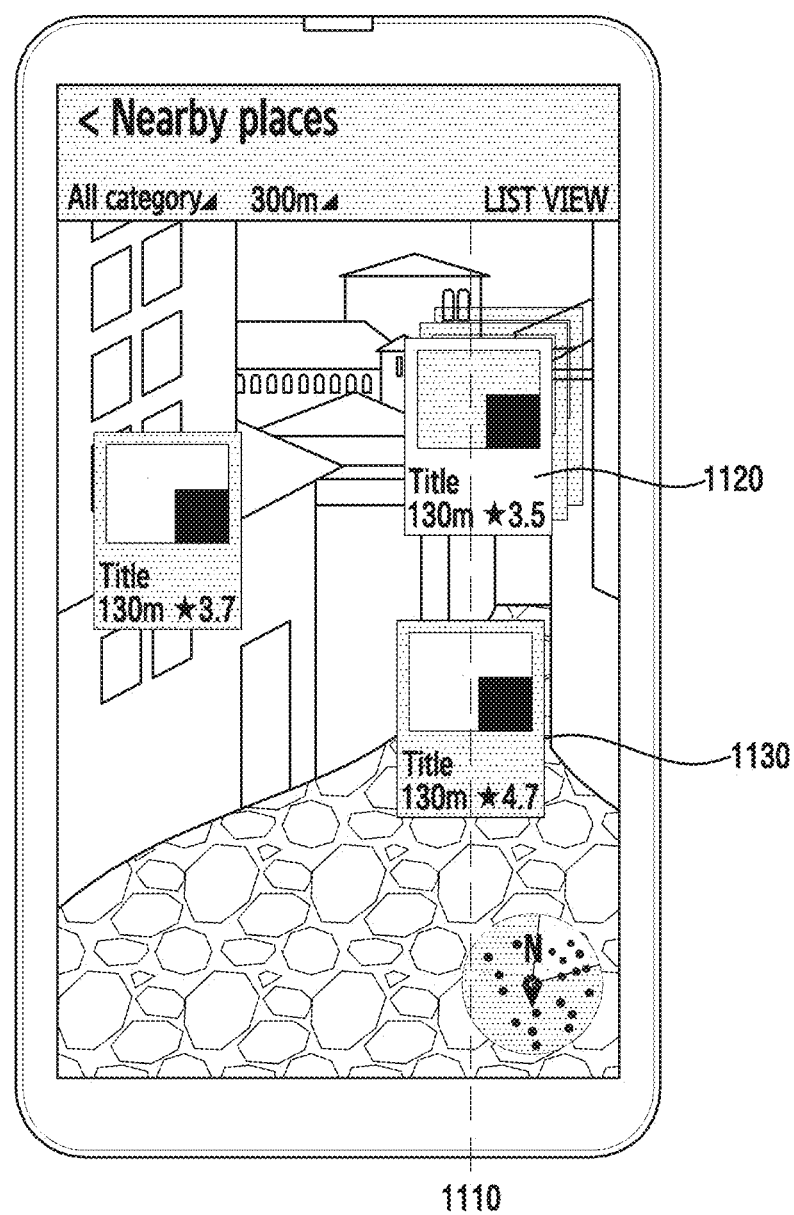
FIG. 11 illustrates an example of a UI provided by an electronic device according to various embodiments of the disclosure.

FIG. 11 illustrates an example of a UI provided by an electronic device according to various embodiments of the disclosure.

Referring to FIG. 11, an AR-based UI according to various embodiments may include the elements described above with reference to FIG. 5, and a detailed description thereof will be omitted.

As illustrated in FIG. 11, according to various embodiments, at least some contents corresponding to cards that can be overlapped among a plurality of contents lying on the same line (for example, a z-axis 1110) may be classified as contents to be grouped and may be provided in a group card 1120. According to various embodiments, contents corresponding to cards that do not overlap among the plurality of contents lying on the same line (for example, the z-axis 1110) may be provided in a single card 1130.

According to various embodiments, a plurality of group cards may also be provided on the same line (e.g., the z-axis 1110) based on whether the contents to be grouped overlap. For example, when a plurality of contents overlaps at the position of the single card 1130 in FIG. 11, a group card may be provided instead of the single card 1130. In this case, a first group card 1120 and a second group card (not shown) may be provided on the z-axis 1110 in an AR screen.

As described above, according to various embodiments, when there is a plurality of contents on the same line in a view direction, various grouping methods may be provided according to the configuration of the electronic device. According to one embodiment, using a first grouping method, all of a plurality of contents on the same line may be grouped and provided in a group card. According to one embodiment, using a second grouping method, only overlapping contents among a plurality of contents on the same line may be grouped and provided in at least one group card, and non-overlapping contents among the plurality of contents on the same line may be provided in a single card.

Figure 12:
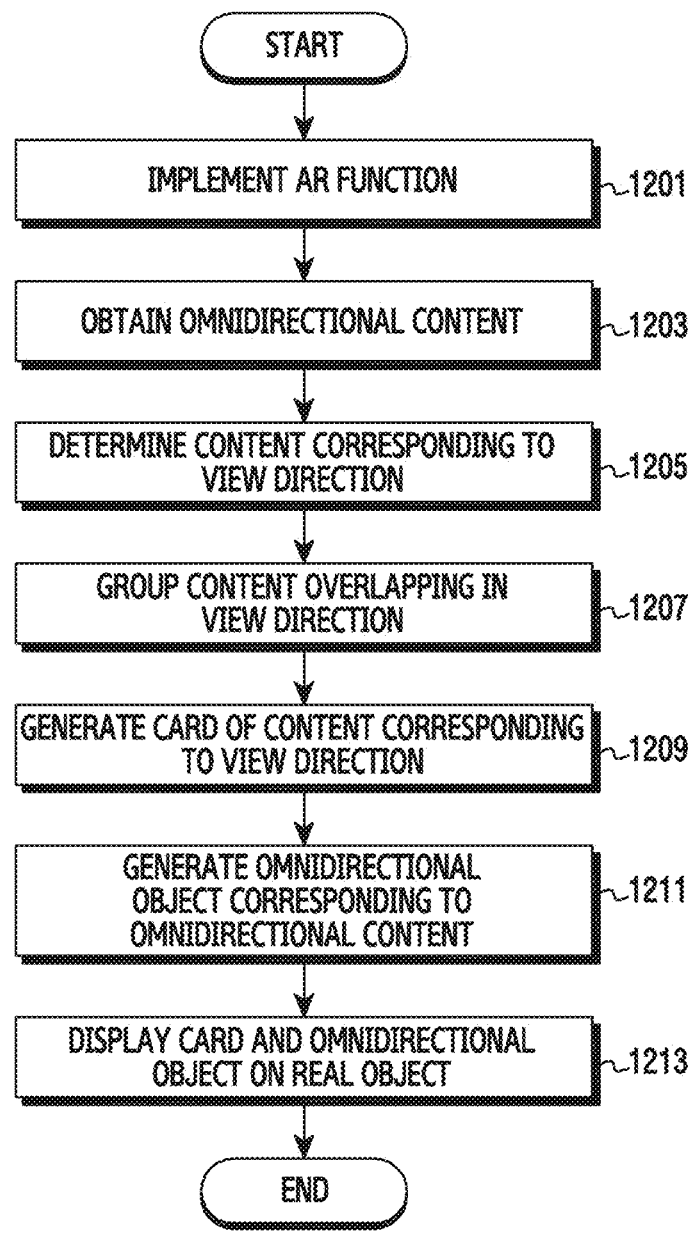
FIG. 12 is a flowchart illustrating an operation method of an electronic device according to various embodiments of the disclosure.

FIG. 12 is a flowchart illustrating an operation method of an electronic device according to various embodiments of the disclosure.

FIG. 12 shows an example of an operation of providing an AR-based UI according to various embodiments of the disclosure.

In operation 1201, a processor 210 of the electronic device may implement an AR function. According to one embodiment, the processor 210 may process the implementation of the AR function based on a request to execute the AR application from a user.

In operation 1203, the processor 210 may obtain omnidirectional contents. According to one embodiment, when the AR application is executed, the processor 210 may obtain a real object (e.g., an actual image), location information, sensor information, and detailed information on the real object in a radius (e.g., 100 m, 200 m, 300 m, or 500 m) and a category set at the current location of the electronic device. The processor 210 may identify the omnidirectional (e.g., 360-degree) contents (e.g., contents in a category and radius set in any direction) based on at least some of the obtained detailed information.

In operation 1205, the processor 210 may determine content corresponding to a view direction. According to various embodiments, the processor 210 may determine (extract) content corresponding to the view direction in which the user is currently looking (or the orientation of the electronic device, e.g., a certain angle (e.g., 15 degrees) among all directions) among the omnidirectional (e.g., 360-degree) contents based on at least some of the obtained detailed information.

In operation 1207, the processor 210 may group contents overlapping in the view direction (e.g., a plurality of contents on the same line). According to one embodiment, as described above, the processor 210 may group a plurality of contents lying on the same line with respect to a z-axis using the first grouping method, or may group the plurality of contents using the second grouping method.

In operation 1209, the processor 210 may generate a card associated with the contents corresponding to the view direction. According to one embodiment, the processor 210 may divide grouped contents and non-grouped contents and may generate at least one group card and at least one single card.

In operation 1211, the processor 210 may generate an omnidirectional object corresponding to the omnidirectional contents. According to various embodiments, the processor 210 may generate the omnidirectional object (e.g., the omnidirectional object 560 of FIG. 5) providing the content distribution (or density) of the omnidirectional contents (e.g., the contents in a category and radius set in any direction) based on at least some (e.g., location, distance, or direction) of the obtained detailed information. In various embodiments, an operation of generating an omnidirectional object may be performed after or in parallel with operation 1203.

In operation 1213, the processor 210 may display the card and the omnidirectional object on a real object on an AR screen. According to various embodiments, the processor 210 may display the card mapped to the real object, wherein a card corresponding to user-preferred content may be provided in a distinguished manner by applying a set special effect.

Figure 13:
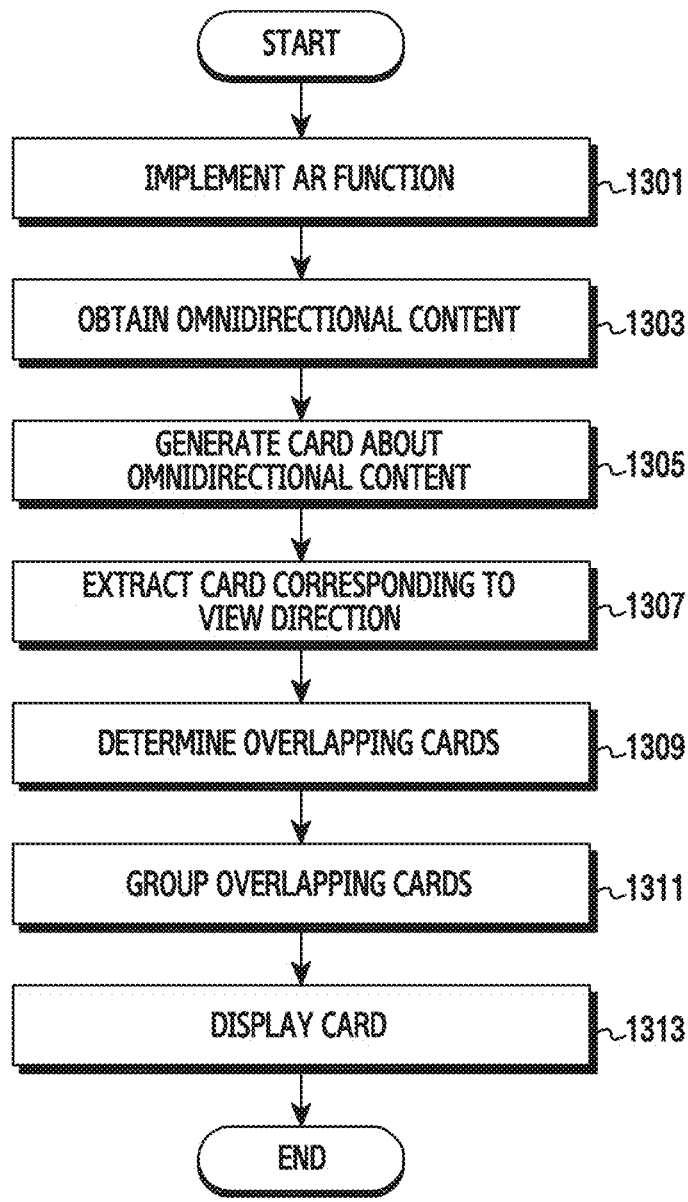
FIG. 13 is a flowchart illustrating an operation method of an electronic device according to various embodiments of the disclosure.

FIG. 13 is a flowchart illustrating an operation method of an electronic device according to various embodiments of the disclosure.

FIG. 13 shows an example of generating cards corresponding to contents, grouping the cards depending on whether the cards overlap, and providing a group card according to various embodiments of the disclosure.

In operation 1301, a processor 210 of the electronic device may implement an AR function. According to one embodiment, the processor 210 may process the implementation of the AR function based on a request to execute the AR application from a user.

In operation 1303, the processor 210 may obtain omnidirectional contents. According to one embodiment, when the AR application is executed, the processor 210 may obtain a real object (e.g., an actual image), location information, sensor information, and detailed information on the real object in a radius and a category set at the current location of the electronic device. The processor 210 may identify the omnidirectional (e.g., 360-degree) contents (e.g., contents in a category and radius set in any direction) based on at least some of the obtained detailed information.

In operation 1305, the processor 210 may generate a card about the omnidirectional contents. According to one embodiment, the processor 210 may generate separate cards (or card information) corresponding to the omnidirectional contents and may store (e.g., temporarily store) and manage the cards.

In operation 1307, the processor 210 may extract a card corresponding to a view direction. According to one embodiment, the processor 210 may determine the view direction and may extract at least one card corresponding to the view direction from the cards respectively corresponding to the omnidirectional contents. In various embodiments, the processor 210 may extract the card corresponding to the view direction based on at least some (e.g., a location, distance, or direction) of the obtained detailed information.

In operation 1309, the processor 210 may determine overlapping cards among the extracted cards. According to various embodiments, the processor 210 may identify a card having at least a portion that overlaps at least one different card among the cards corresponding to the view direction. According to various embodiments, the processor 210 may be configured to identify only a card that overlaps at a set overlapping degree or greater.

In operation 1311, the processor 210 may group the overlapping cards. For example, the processor 210 may group at least two or more cards extracted based on the determination result in operation 1309 to generate a group card.

In operation 1313, the processor 210 may display the card. According to one embodiment, the processor 210 may process a single card that is not grouped and a group card that is grouped to be displayed on an AR screen on a display.

Figure 14:
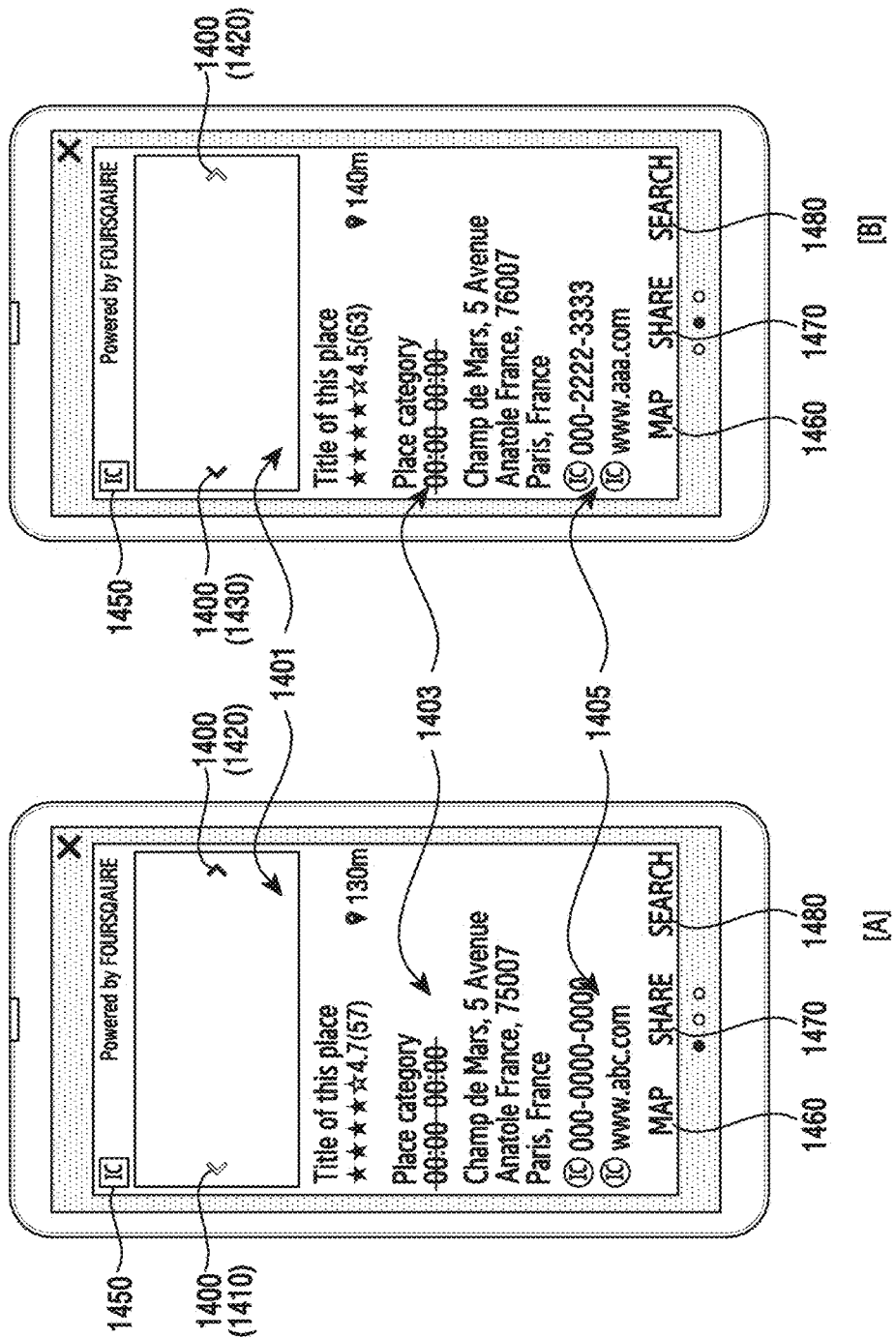
FIG. 14 illustrates an example of a UI provided by an electronic device according to various embodiments of the disclosure.

FIG. 14 illustrates an example of a UI provided by an electronic device according to various embodiments of the disclosure.

FIG. 14 shows an example of a UI (hereinafter, detailed information UI or detailed information display screen) for providing detailed information related to individual contents (or individual cards) of a group card based on a user interaction on the group card according to various embodiments of the disclosure.

As illustrated in FIG. 14, the detailed information UI may include a first information area 1401, a second information area 1403, and a third information area 1405, and may include a function menu 1460, 1470, and 1480 for implementing or interworking with another function (e.g., map, share, and search functions) associated with an AR function.

In various embodiments, the detailed information UI may be provided, for example, by a user interaction (e.g., a touch) on a particular card (e.g., a group card or a single card), as described above with reference to FIG. 5. According to one embodiment, when the electronic device senses a user interaction on a single card, the electronic device may display a UI including detailed information about corresponding content of the single card. According to one embodiment, when the electronic device senses a user interaction on a group card, the electronic device may display a UI including detailed information about corresponding content of the uppermost card of the group card, which may further include a switch object (e.g., an element 1400 of FIG. 14) to navigate to content of another grouped card.

In various embodiments, the first information area 1401 may represent an image area that displays a multimedia object (e.g., an image or a video) related to content of a card selected by a user. The second information area 1403 may represent an area for providing the title, category, or address information of the selected card (or content). The third information area 1405 may represent an area for providing information on a contact number (e.g., telephone number) or URL of the selected card (or content).

According to various embodiments, the user may play a multimedia object in the first information area 1401 using a user interaction (e.g., a touch) via the first information area 1401. According to various embodiments, the user may display map information (e.g., a map) based on the user's current location using a user interaction (e.g., a touch) via the second information area 1403.

According to various embodiments, the user may perform a call function or a homepage access function using a user interaction (e.g., a touch) via the third information area 1405. According to one embodiment, the electronic device may open (execute) a call dialer in response to detecting the selection of a telephone number in the third information area 1405. According to one embodiment, the electronic device may open (execute) a browser in response to detecting the selection of a URL in the third information region 1405.

In various embodiments, the function menu may be included in the third information area 1405. In various embodiments, the function menu may include, for example, a map menu 1460 to display map information (e.g., a map) based on the current location of the user, a share menu 1470 to support sharing of content currently displayed on the detailed information UI with another electronic device (or user), and a search menu 1480 to support information search (e.g., Internet search) related to content currently displayed on the detailed information UI.

In various embodiments, an element 1450 of FIG. 14 may be an information object that represents the category (or attribute) of content or a card. For example, the information object 1450 may be provided in one area of the detailed information UI (e.g., on the top left of the image area). In various embodiments, the information object 1450 may represent the category (or attribute) based on a set text, image, or icon.

According to various embodiments, when the detailed information UI is executed according to a user interaction on a group card, the detailed information UI may include the switch object 1400 to navigate to content of another grouped card, illustrated in examples (A) and (B), respectively shown as objects [A] and [B] in FIG. 14. According to one embodiment, the detailed information UI in example (A) may be a UI associated with a first card (e.g., the uppermost card) of the group card. According to one embodiment, the detailed information UI in example (B) may be a UI associated with a second card (e.g., a card below the uppermost card) preceding or following the first card.

According to various embodiments, the switch object 1400 to switch to detailed information related to the first card and the second card may be provided. The switch object 1400 may include a first object 1410 and 1430 to switch to detailed information on a card preceding the group card and a second object 1420 to switch detailed information on a card following the group card. According to various embodiments, when there is no card preceding or following the current card, the first object or the second object of the switch object 1400 may be processed to be dim (e.g., translucent or shaded), thereby indicating to the user that there is no preceding or following card. For example, the first object 1410 illustrated in example (A) is processed to be dim because there is no preceding card, and the first object 1430 illustrated in example (B) is indicated normally, showing that there is a preceding card. According to one embodiment, when example (A) is switched to example (B) by the user selecting the second object 1420 (or a user interaction (e.g., a touch gesture) using the first information area 1401) in example (A), the first object 1410 in example (A) may be changed to the first object 1430 in example (B).

According to various embodiments, switching between pieces of detailed information may be performed based on the switch object 1400 or based on the user's touch gesture (e.g., a swipe, a flick, or a drag).

Figure 15:
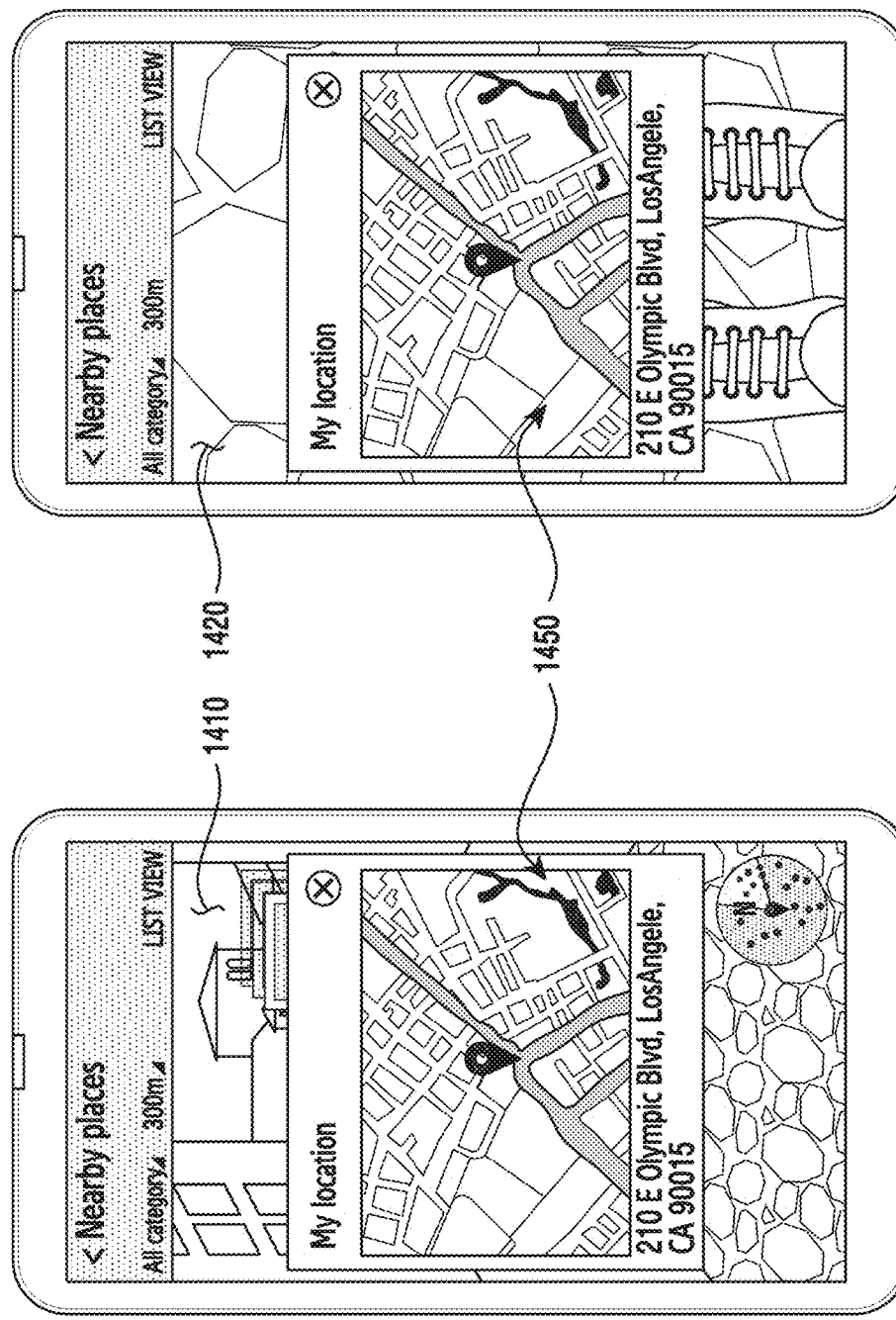
FIG. 15 illustrates an example of a UI provided by an electronic device according to various exemplary embodiments of the present disclosure.

FIG. 15 illustrates an example of a UI provided by an electronic device according to various embodiments of the disclosure.

FIG. 15 shows an example of providing a user-location map on an AR screen 1410 and 1420 based on a user interaction according to various embodiments of the disclosure.

As illustrated in examples (A) and (B), respectively shown as objects [A] and [B] in FIG. 15, a map including user location information and surrounding information may be provided through a popup window 1450 on the AR screen 1410 and 1420. In various embodiments, the maps displayed in examples (A) and (B) may be obtained by capturing a certain range of the entire map from the user's location and providing the range as an image.

Example (A) of FIG. 15 shows an example of providing the map according to a user interaction by the omnidirectional object 560 as described above with reference to FIG. 5. According to one embodiment, the user may touch the omnidirectional object 560, and the electronic device may provide a map in an overlaid form based on a specified transparency level on the AR screen 1410 in response to detection of a user interaction via the omnidirectional object 560.

According to various embodiments, the user interaction by the omnidirectional object 560 may be input in a state where the user is watching the AR screen 1410 (e.g., a state where the electronic device is photographing the real world from the front). Thus, in various embodiments, when displaying a map, the map may be provided in the uppermost layer while maintaining the state of the AR screen 1410 (e.g., the current state including all elements including an actual image, a card, an omnidirectional object, or the like). However, the disclosure is not limited to the foregoing configuration, and the map may be provided in the uppermost layer while maintaining only some elements (e.g., an actual image) on the AR screen 1410.

Example (B) of FIG. 15 shows an example of providing the map according to an interaction by the state change (e.g., the position change) of the electronic device. According to one embodiment, as illustrated in FIG. 5, the user may change the state of the electronic device in order to invoke a user-location map (or user location-based map) in the state where the user is watching the AR screen 510 (e.g., the state where the electronic device is photographing the real world from the front). According to one embodiment, as illustrated in example (B) of FIG. 15, the user may make a motion of tilting the electronic device downwards (e.g., tilting the electronic device so as to be horizontal with the ground and photographing the real world downward). For example, the electronic device may photograph the ground at the level of the user's feet, as in the AR screen 1420. According to various embodiments, the electronic device may provide a map in an overlaid form based on a specified transparency level on the AR screen 1420 in response to detection of the state change.

According to various embodiments, the interaction due to the state change may operate based on the state in which the user adjusts the electronic device to face the ground. Thus, there may be no content or no intended content at the user location (e.g., at the feet). Thus, in various embodiments, when displaying a map, the map may be provided in the uppermost layer while displaying only the components of an actual image of the AR screen 1420. According to one embodiment, the AR screen 1420 illustrated in example (B) may correspond to a preview screen captured by a camera. According to various exemplary embodiments, when the state change of returning to the original state is detected in the state of example (B), the electronic device may display the original AR screen 510 before the map is displayed.

According to various embodiments, the user may display a map or may return to and display an AR screen including all components based on a gesture for changing the state of the electronic device (e.g., looking down, looking up, or the like).

Figure 16:
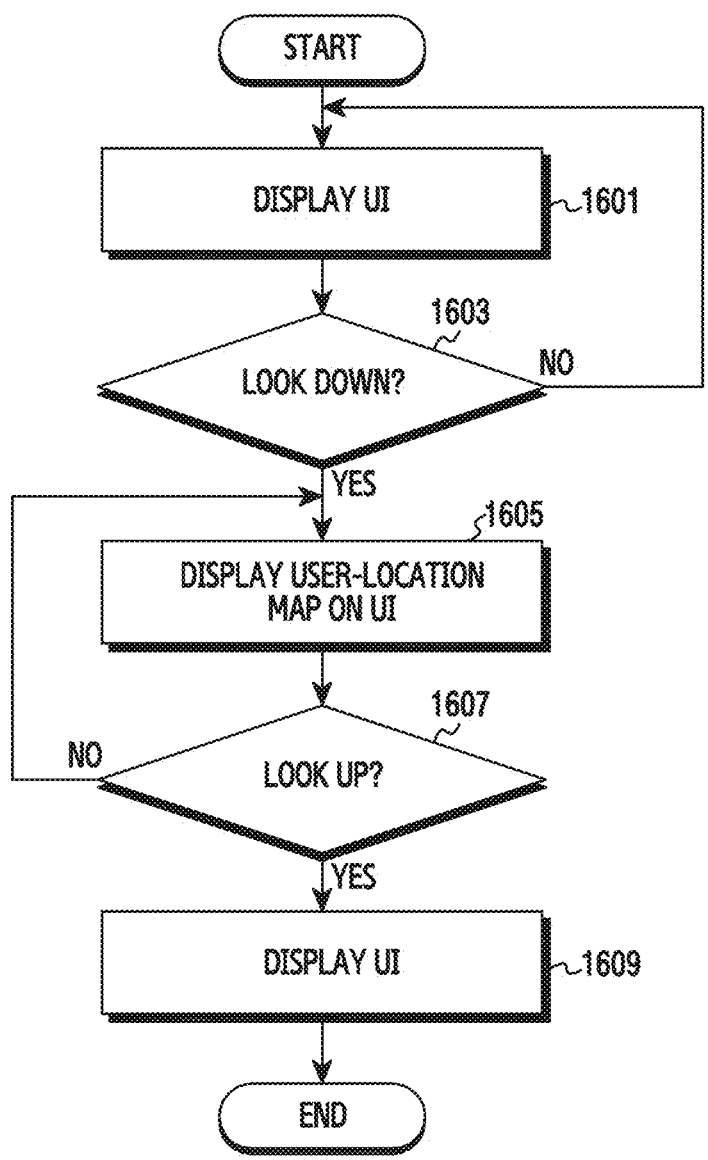
FIG. 16 is a flowchart illustrating an operation method of an electronic device according to various embodiments of the disclosure.

FIG. 16 is a flowchart illustrating an operation method of an electronic device according to various embodiments of the disclosure.

FIG. 16 shows an example of providing a user-location map on an AR screen according to an interaction by the state change (or position change) of the electronic device according to various embodiments of the disclosure. According to various embodiments, the electronic device may pre-configure a first interaction (or information about a user action (e.g., a movement)) for invoking and displaying a user-location map, with an AR function implemented, and a second interaction for canceling a display map and for returning to the original state (e.g., an AR function-implemented state). In various embodiments, the first interaction may be, for example, a look-down gesture corresponding to front-back (or back-and-forth) tilting of the electronic device, and the second interaction may be, for example, a look-up gesture corresponding to front-back (or back-and-forth) tilting of the electronic device.

In operation 1601, a processor 210 of the electronic device may display a UI. According to one embodiment, the processor 210 may execute an AR application and may display a UI (hereinafter, "first UI") as illustrated in FIG. 5 based on obtained detailed information.

In operation 1603, the processor 210 may determine whether the electronic device has a state change corresponding to a look-down position (e.g., a first position). According to one embodiment, the processor 210 may monitor the position of the electronic device and may determine the state change (e.g., the position of the electronic device) based on a change in position information (e.g., pitch, roll, yaw, or the like) on the electronic device.

When the state in which the electronic device looks down is not detected in operation 1603 (no in operation 1603), the processor 210 may return to operation 1601 and may perform operation 1601 and subsequent operations.

When the state in which the electronic device looks down is detected in operation 1603 (yes in operation 1603), the processor 210 may display a user-location map on the UI in operation 1605. According to one embodiment, the processor 210 may display the map based on a UI (hereinafter "second UI") as illustrated above in example (B) of FIG. 15.

In operation 1607, the processor 210 may determine whether the electronic device has a state change corresponding to a look-up position (e.g., a second position). According to one embodiment, the processor 210 may monitor the position (e.g., state change) of the electronic device in a state of displaying the map (e.g., a first position state).

When the state in which the electronic device looks up is not detected in operation 1607 (no in operation 1607), for example, when it is determined that the electronic device looks down and maintains the first position, the processor 210 may return to operation 1605 and may perform operation 1605 and subsequent operations.

When the state in which the electronic device looks up is detected in operation 1607 (yes in operation 1607), the processor 210 may display a UI in operation 1609. According to one embodiment, when a state change from the look-down position (first position) to the look-up position (second position) is detected, the processor 210 may display a UI corresponding to the first UI including no map in operation 1601 based on the detection result. For example, the processor 210 may provide the first UI switched from the second UI.

As described above, an operation method of an electronic device according to various embodiments may include: implementing an AR function; determining a plurality of contents according to a set criterion in a view direction of a user; grouping the plurality of contents into at least one group; generating a group card corresponding to a plurality of contents and a single card corresponding to a single content based on a grouping result; and displaying the group card and the single card mapped to a real object on the AR screen.

According to various embodiments, the set criterion may include a criterion related to the same direction, the same line, or the same angle in the view direction.

According to various embodiments, the set criterion may be set based on at least one z-axis in the view direction.

According to various embodiments, the generating of the card may include: obtaining detailed information related to the real object in response to implementation of the AR function; determining a plurality of contents based on the set criterion in the view direction based on at least some of the detailed information; grouping a plurality of contents and generating the group card corresponding to the grouped contents when there is a plurality of contents according to the set criterion; and generating the single card corresponding to a single content when there is a single content according to the set criterion.

According to various embodiments, the generating of the group card may include: generating the group card in any one type among a group type of displaying a plurality of information cards corresponding to individual contents belonging to a plurality of contents as one group, a badge type including a badge object indicating information on the number of grouped contents, and a highlighting type of displaying the group card based on an effect for distinguishing the group card from the single card.

According to various embodiments, the grouping may include grouping all of the plurality of contents corresponding to the set criterion in the view direction.

According to various embodiments, the grouping may include grouping at least some contents among the plurality of contents corresponding to the set criterion based on an overlapping degree of the plurality of contents corresponding to the set criterion in the view direction.

According to various embodiments, the method may further include: displaying a detail page associated with a plurality of contents grouped based on a first user interaction by the group card; and switching to and displaying an information card displayed by the group card based on a second user interaction by the group card.

According to various embodiments, the method may further include displaying a user-location map based on an interaction related to a state change of the electronic device.

According to various embodiments, the map may be a map obtained by capturing a certain range based on a user location and providing the range as an image.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera;
   a display to display an augmented reality (AR) screen; and
   at least one processor functionally connected to the camera and the display,
   wherein the at least one processor is configured to:
      implement an AR function,
      display a menu area for selecting a category of content and a range of view,
      determine a plurality of contents according to a set criterion in a view direction of a user,
      group the plurality of contents into at least one group based on the selected category of content and the selected range of view,
      generate a group card corresponding to the plurality of contents and a single card corresponding to a single content based on a grouping result, and
      display the group card and the single card mapped to a real object on the AR screen.

2. The electronic device of claim 1, wherein the set criterion comprises a criterion related to same direction, same line, or same angle in the view direction.

3. The electronic device of claim 2, wherein the set criterion is set based on at least one z-axis in the view direction.

4. The electronic device of claim 1, wherein the at least one processor is further configured to:
   obtain detailed information related to the real object in response to implementation of the AR function;
   determine the plurality of contents according to the set criterion in the view direction of the user based on at least some of the detailed information;
   group the plurality of contents and generate the group card corresponding to the plurality of contents according to the set criterion; and
   generate the single card corresponding to the single content according to the set criterion.

5. The electronic device of claim 4, wherein the at least one processor is further configured to generate the group card in any one type among:
   a group type of displaying a plurality of information cards corresponding to individual contents belonging to a plurality of contents as one group,
   a badge type comprising a badge object indicating information on a number of grouped contents, and
   a highlighting type of displaying the group card based on an effect for distinguishing the group card from the single card.

6. The electronic device of claim 1, wherein the at least one processor is further configured to group all of the plurality of contents corresponding to the set criterion in the view direction.

7. The electronic device of claim 1, wherein the at least one processor is further configured to group at least some contents among the plurality of contents corresponding to the set criterion based on an overlapping degree of the plurality of contents corresponding to the set criterion in the view direction.

8. The electronic device of claim 1, wherein the at least one processor is further configured to:
   display a detail page associated with a plurality of contents grouped based on a first user interaction by the group card; and
   switch to and display an information card displayed by the group card based on a second user interaction by the group card.

9. The electronic device of claim 1, wherein the at least one processor is further configured to display a user-location map based on an interaction related to a state change of the electronic device.

10. The electronic device of claim 9, wherein the map comprises a map obtained by capturing a certain range based on a user location and by providing the certain range as an image.

11. An operation method of an electronic device, the method comprising:
 implementing an augmented reality (AR) function and displaying an AR screen;
 displaying a menu area for selecting a category of content and a range of view;
 determining a plurality of contents according to a set criterion in a view direction of a user;
 grouping the plurality of contents into at least one group based on the selected category of content and the selected range of view;
 generating a group card corresponding to the plurality of contents, and a single card corresponding to a single content based on a grouping result; and
 displaying the group card and the single card mapped to a real object on the AR screen.

12. The method of claim 11, wherein the set criterion comprises a criterion related to same direction, same line, or same angle in the view direction.

13. The method of claim 12, wherein the set criterion is set based on at least one z-axis in the view direction.

14. The method of claim 11, wherein the generating of the group card comprises:
 obtaining detailed information related to the real object in response to implementation of the AR function;
 determining the plurality of contents according to the set criterion in the view direction of the user based on at least some of the detailed information;
 grouping the plurality of contents and generating the group card corresponding to the plurality of contents according to the set criterion; and
 generating the single card corresponding to the single content according to the set criterion.

15. The method of claim 14, wherein the generating of the group card further comprises:
 generating the group card in any one type among:
  a group type of displaying a plurality of information cards corresponding to individual contents belonging to a plurality of contents as one group,
  a badge type comprising a badge object indicating information on a number of grouped contents, and
  a highlighting type of displaying the group card based on an effect for distinguishing the group card from the single card.

16. The method of claim 11, wherein the grouping of the plurality of contents comprises grouping all of the plurality of contents corresponding to the set criterion in the view direction.

17. The method of claim 11, wherein the grouping of the plurality of contents comprises grouping at least some contents among the plurality of contents corresponding to the set criterion based on an overlapping degree of the plurality of contents corresponding to the set criterion in the view direction.

18. The method of claim 11, further comprising:
 displaying a detail page associated with a plurality of contents grouped based on a first user interaction by the group card; and
 switching to and displaying an information card displayed by the group card based on a second user interaction by the group card.

19. The method of claim 11, further comprising:
 displaying a user-location map based on an interaction related to a state change of the electronic device.

20. The method of claim 11,
 wherein at least one of the group card or the single card is superimposed on an image being photographed or viewed by a camera of the electronic device, and
 wherein the image is displayed on a display of the electronic device.

* * * * *